US012802161B2

(12) United States Patent
Perrone

(10) Patent No.: US 12,802,161 B2
(45) Date of Patent: Nov. 17, 2026

(54) SYSTEM AND METHOD FOR DIGITAL RECONSTRUCTION STRUCTURES OF AN OBJECT

(71) Applicant: KONINKLIJKE PHILIPS N.V., Eindhoven (NL)

(72) Inventor: Antonio Luigi Perrone, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 240 days.

(21) Appl. No.: 18/721,214

(22) PCT Filed: Dec. 20, 2022

(86) PCT No.: PCT/EP2022/086824
§ 371 (c)(1),
(2) Date: Jun. 18, 2024

(87) PCT Pub. No.: WO2023/118028
PCT Pub. Date: Jun. 29, 2023

(65) Prior Publication Data

US 2025/0061539 A1 Feb. 20, 2025

(30) Foreign Application Priority Data

Dec. 21, 2021 (EP) ..................................... 21216338

(51) Int. Cl.
*G06T 7/00* (2017.01)
*G06T 3/4038* (2024.01)
(Continued)

(52) U.S. Cl.
CPC .............. *G06T 3/4038* (2013.01); *G06T 7/38* (2017.01); *G06T 7/74* (2017.01); *G06T 2207/10016* (2013.01); *G06T 2207/30036* (2013.01)

(58) Field of Classification Search
CPC ........... G06T 3/4038; G06T 7/38; G06T 7/74; G06T 2207/10016; G06T 2207/30036; G06T 2207/10036
See application file for complete search history.

(56) References Cited

U.S. PATENT DOCUMENTS 10,595,626 B2 3/2020 Jeanne et al.
2010/0170052 A1* 7/2010 Ortins .................. A63F 13/213 15/106
(Continued)

FOREIGN PATENT DOCUMENTS

CN 107798656 A 3/2018
CN 107862359 A 3/2018
(Continued)

OTHER PUBLICATIONS

Da Cunha et al., "The Nonsubsampled Contourlet Transform: Theory, Design, and Applications", IEEE Transactions on Image Processing, vol. 15, Issue 10, pp. 3089-3101, (Oct. 2006).
(Continued)

*Primary Examiner* — Van D Huynh

(57) ABSTRACT

A system is provided for digitally reconstructing a structure of a region of interest for an object. The system comprises an imaging device configured to obtain a sequence of images of the region of interest and a processor. The processor is configured to analyze system data which at least coveys information about the imaging device position relative to the region of interest. Quasi-periodic behaviors are extracted from the system data, redundancy is removed in the sequence of images and/or system data using the identified quasi-periodic behaviors, and the structure of the region of interest is reconstructed using the sequence of images and system data.

15 Claims, 14 Drawing Sheets

(51) Int. Cl.
*G06T 7/38* (2017.01)
*G06T 7/73* (2017.01)

(56) References Cited

U.S. PATENT DOCUMENTS

| | | | | |
|---|---|---|---|---|
| 2011/0247156 | A1* | 10/2011 | Schmid | A63F 13/245 15/105 |
| 2013/0095459 | A1 | 4/2013 | Tran | |
| 2016/0163115 | A1 | 6/2016 | Furst | |
| 2018/0025529 | A1* | 1/2018 | Wu | G06T 15/04 345/426 |
| 2020/0359777 | A1* | 11/2020 | Pesach | G06V 40/165 |
| 2021/0045852 | A1 | 2/2021 | Atiya et al. | |
| 2022/0142750 | A1* | 5/2022 | Dillon | A61C 9/006 |
| 2024/0041571 | A1* | 2/2024 | Tao | A61C 9/0053 |

FOREIGN PATENT DOCUMENTS

| | | | |
|---|---|---|---|
| EP | 2365848 | B1 | 4/2016 |
| WO | 2016144382 | A1 | 9/2016 |
| WO | 2019102480 | A1 | 5/2019 |
| WO | 2019207588 | A2 | 10/2019 |
| WO | 2021148764 | A1 | 7/2021 |

OTHER PUBLICATIONS

Hirmer et al., "Spectroscopic Study of Human Teeth and Blood from Visible to Terahertz Frequencies for Clinical Diagnosis of Dental Pulp Vitality", Journal of Infrared, Millimeter, and Terahertz Waves, vol. 33 Issue 3, pp. 366-375, (2012).

Fried et al., (1995). "Nature of light scattering in dental enamel and dentin at visible and near-infrared wavelengths" Appl. Opt., 34, 1278-1285 (Abstract).

Zandona et al., (2019), "Detection and Assessment of Dental Caries" Springer (Abstract).

* cited by examiner

402

404

SYSTEM AND METHOD FOR DIGITAL RECONSTRUCTION STRUCTURES OF AN OBJECT

This application is the U.S. National Phase application under 35 U.S.C. § 371 of International Application No. PCT/EP2022/086824, filed on Dec. 20, 2022, which claims the benefit of EP Application Serial No. 21216338.0, filed Dec. 21, 2021. These applications are hereby incorporated by reference herein.

FIELD OF THE INVENTION

The invention relates to the imaging and digital reconstruction of structures of an object, for example as part of a personal care system.

BACKGROUND OF THE INVENTION

There has been a recent interest in integrating cameras or other types of imaging device into personal care devices such as oral care devices. Such imaging-assisted oral care devices can be an enabler for image-based diagnostics, superior location sensing, therapy planning (e.g., orthodontics, aligners) or treatment monitoring (e.g., periodontitis), seamlessly integrated into the regular oral hygiene regimen of a user instead of using separate devices.

Dental endoscopes or intraoral scanners exist which can detect various structures and conditions, including diseases of the oral cavity. By forming these scanners as standalone devices, separate to a toothbrush head for example, there is no problem of positioning the sensors relative to a toothbrush head appropriately in order to avoid problems such as interference with the bristles positions (which are critical for the cleaning efficacy of the toothbrush), interference from the toothpaste and various residuals of the cleaning process and a sub-optimal field of view.

From such stand-alone imaging devices, a virtually continuous stream of images can be collected but it usually requires a separate workflow and scanning procedure performed by either the user or a dental professional. For handheld personal care devices with integrated image sensors, this stream of images poses many challenges but the most pressing ones, for daily utilization during regular personal care routines, are how to reduce the data flow to only the data which is essential, how to create a 3D localization map from the many images (usually acquired with a single camera) and how to optimize the data flow to enable near real-time processing and image representation with limited on-device processing resources.

The images from the imaging devices can be consulted for diverse types of indications (e.g., instructions on how to perform the oral care actions in an optimal way, personalization suggestions etc.). Most, if not all, of such indications are based on the assumptions of, or highly benefit from, some form of precise localization of the device in the various images and images sequences. Moreover, a global map of the interested user's biology (e.g., oral cavity, head/face/neck skin etc.) is of the outmost interest for visualization purposes, both for reference between the present and future planned actions, and for proper healthcare related tasks such as identification of abnormalities, pathologies etc.

However, the construction of such comprehensive maps usually requires a set of external reference points or reference landmarks usually generated by dedicated hardware solutions for independent spatial reference.

Thus, there is a need for an improved method for reconstructing a structure from a stream of images. Moreover, there is a need for solution to enable acquisition of computationally efficient 3D image maps in a home environment when imaging modalities (e.g. camera) are integrated in the regular workflow of the use of a personal care or personal health device.

US 2016/136115 discloses a system for stitching together optical scan data for a first portion of a three dimensional object and ultrasound for a second portion of the three dimensional object. The object is for example a portion of a jaw, and the stitched image is used to assist the design of a crown, denture or bridge, for example.

SUMMARY OF THE INVENTION

The invention is defined by the claims.

According to examples in accordance with an aspect of the invention, there is provided a system for digitally reconstructing a structure of a region of interest for an object, the system comprising:

- an imaging device configured to obtain a sequence of images of the region of interest; and
- a processor configured to:
  - analyze system data, including at least data enabling identification of the imaging device position relative to the region of interest, and extract quasi-periodic behaviors from the system data;
  - remove redundancy in the sequence of images and/or system data using the identified quasi-periodic behaviors; and
  - reconstruct the structure of the region of interest using the sequence of images and system data.

Many actions performed by humans (and animals) are somewhat periodic (i.e. quasi-periodic). These actions, in particular, include self-care actions. For example, brushing teeth or shaving comprises quasi-periodic behaviors. It has been realized that these quasi-periodic behaviors may be identified and used to remove redundancy in data of the particular structure (i.e. remove redundancy in the images or system data).

The removal of (at least part of) the redundancy in the data allows the structure to be reconstructed much faster than it would have been without the removal of the redundancy as there is less data to process during the reconstruction.

The processor may be configured to remove redundancy by identifying redundant images in the sequence of images based on the quasi-periodic behaviors and removing the redundant images from the sequence of images.

Due to the quasi-periodic behaviors, it is likely that images in the sequence of images contain the same, or very similar, information than other images in the sequence of images. Thus, redundancy can be removed by removing images from the sequence of images which are similar to other images in the sequence.

The processor may be further configured to filter the sequence of images to remove images with quality parameters which are inadequate for the reconstruction.

In many cases, it is possible that the sequence of images contains images which are of a low quality. For example, these images may contain excessive blur, an occluded field of view etc. Thus, filtering the sequence of images to remove the low quality images further reduces the data which needs to be processed during the reconstruction.

The images in the sequence of images may be multi-spectral images and the structure of the region of interest may be reconstructed separately for each spectral band in the multi-spectral images.

Different spectral bands comprise different levels of detail for different parts of the images. The particular spectral bands may depend on the region of interest which is being imaged. Thus, the structure of the region of interest can be reconstructed separately for the different spectral bands and each reconstruction may comprise different levels of detail for different elements in the region of interest.

The processor may be configured to reconstruct the structure by identifying structural features in the reconstructed structures of the spectral bands and merging the reconstructed structures of the spectral bands by matching the structural features of the spectral bands.

In order to obtain a more fully detailed reconstruction, all of the reconstructions from the different spectral bands can be merged together to generate a reconstruction with increased detail relative to the separate reconstructions.

The processor may be further configured to estimate a spatial position of a next image in the sequence of images based on the position of a previous image and the quasi-periodic behaviors, obtain a real spatial position of the next image and adapt the quasi-periodic behaviors based on a comparison between the estimated spatial position and the real spatial position.

This feedback loop between the identified quasi-periodic behaviors and the measurements of the real positions increases the accuracy of the quasi-periodic behaviors over time and can adapt based on changes in the behavior. For example, the frequency of a quasi-periodic behavior may change over time as, for example, the user gets tired and performs the behavior slower or with less force.

The system may further comprise a sensor system, such as an inertial measurement unit, IMU, configured to obtain the system data corresponding to the images in the sequence of images.

The processor may be configured to remove redundancy in the system data based on comparing the system data to the quasi-periodic behaviors.

The system data can be used in the reconstruction to obtain the relationship between pixel data in the images and the position of the pixel data in the reconstruction. Thus, redundant system data can be removed to reduce the data which has to be processed for determining the corresponding placement of the pixel data in the reconstruction.

The invention also provides a personal care device comprising:

a personal care unit and handle; and the system defined above, wherein the region of interest is the oral cavity or a portion thereof.

The imaging device may be positioned at the handle or the personal care unit. For example, the personal care unit could be a cleaning unit, a shaving unit, an exfoliating unit etc.

The personal care device may be a toothbrush comprising a toothbrush head section and bristles and wherein the imaging device is configured to obtain images in the direction of the still bristles.

The invention also provides a computer-implemented method for digitally reconstructing a structure of a region of interest for an object, the method comprising:

obtaining a sequence of images of the region of interest using an imaging device;

analyzing system data, including at least data enabling identification of the imaging device position relative to the region of interest, and extract quasi-periodic behaviors from the system data;

removing redundancy in the sequence of images and/or system data using the identified quasi-periodic behaviors; and reconstructing the structure of the region of interest using the sequence of images and system data.

Removing redundancy may comprises identifying redundant images in the sequence of images based on the quasi-periodic behaviors and removing the redundant images from the sequence of images.

The images in the sequence of images may be multi-spectral images and the structure of the region of interest may be reconstructed separately for each spectral band in the multi-spectral images.

The method may further comprise estimating a spatial position of a next image in the sequence of images based on the position of a previous image and the quasi-periodic behaviors, obtaining a real spatial position of the next image and adapting the quasi-periodic behaviors based on a comparison between the estimated spatial position and the real spatial position.

The invention also provides a computer program product comprising computer program code which, when executed on a computing device having a processing system, cause the processing system to perform all of the steps of the afore-mentioned method.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
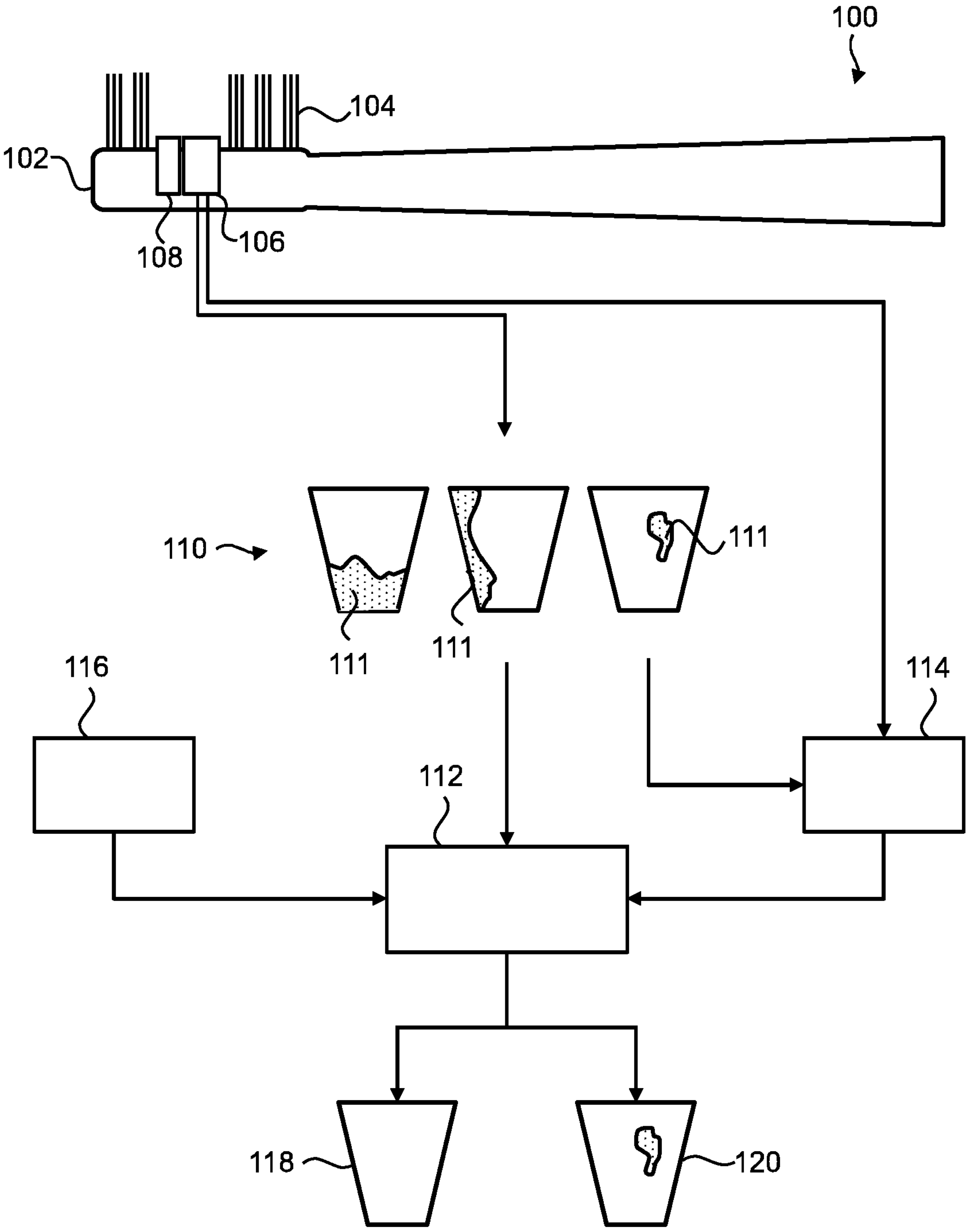
FIG. 1 shows an illustration of an oral care system and in particular a toothbrush head.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a system for digitally reconstructing a structure of a region of interest for an object. The system comprises an imaging device configured to obtain a sequence of images of the region of interest and a processor. The processor is configured to analyze system data which at least coveys information about the imaging device position relative to the region of interest. Quasi-periodic behaviors are extracted from the system data, redundancy is removed in the sequence of images and/or system data using the identified quasi-periodic behaviors, and the structure of the region of interest is reconstructed using the sequence of images and system data.

The system may also be used in an oral care system such as, but not exclusively, a toothbrush head.

The system may further comprise an oral care device comprising, for example, a handle and/or a cleaning unit. The imaging device can be positioned anywhere useful to observe the anatomy and physiology, e.g., in the handle or the cleaning unit.

The oral care device may be a toothbrush comprising a toothbrush head section and bristles and wherein the imaging device is configured to obtain images mainly, but not exclusively, in the direction of the still bristles.

Alternatively, the oral care device could be a different oral care device such as, for example, brushing mouthpieces, irrigators, brushing-flossing devices, whitening mouthpieces etc.

FIG. 1 shows an illustration of an oral care system and in particular a toothbrush head. The toothbrush head 100 is shown having a head section 102 with bristles 104 protruding from the head section 102. A camera/imaging device 106 is positioned within the head section 102 and is used to acquire oral images 110 or video sequences during regular brushing of the teeth. The camera 106 may, for example, be an RGB-camera, an imaging device operating in the visible and near infrared (VISNIR) spectrum with wavelengths approximately in the range 400-1100 nm, or a miniaturized multispectral imaging device. A light emitting device 108 may be used to illuminate the mouth of the user with visible, infrared, broadband or single frequency type illumination.

A processor 112 is used to process the sequences of acquired images 110 and use an image reconstruction algorithm to generate toothpaste-free images. The processor 112 segments the toothpaste 111 from the images 110 and the reconstruction algorithm patches/stitches the images 110 to reconstruct images of the mouth of the user.

The images 110 may be decomposed into red (R), blue (B) and green (G) channel images, thereby separating each image into three spectrum components. The three spectrum components are used for color clustering the pixels (or groups of pixels) in the images 110. The color clustering of these visible spectrum bands provides spectral components of the images 110.

If the images 110 are VISNIR images, they may be decomposed into further spectrum bands including the near-infrared range of wavelengths. Decomposing discrete bands of the near-infrared wavelengths may be referred to as density clustering (as opposed to color clustering for the visible spectrum). The density clustering of the near-infrared (NIR) spectrum provides spectral components of the images 110.

If the images 110 are hyperspectral images, they may be decomposed from the hyperspectral cube, where the hyperspectral cube provides the spectral components of the images 110.

Reference spectral measurements 114 of the toothpaste being used may be obtained at the initial moments of the cleaning session. The spectral measurements 114 are used to obtain a spectral fingerprint of the toothpaste. The spectral fingerprint enables the processor 112 to identify and segment the toothpaste from the images 110.

The spectral measurements 114 may be updated over time during the event (i.e., brushing teeth). The images 110 may be used to update the spectral measurements 114 such that the spectral fingerprint of the toothbrush can also be updated.

Alternatively, a database 116 may be kept, online or offline, which contains the spectral fingerprints of various toothpastes and this data can be retrieved by the processor 112 to identify and segment the toothpaste from the images.

Thus, with the use of the spectral fingerprint, toothpaste occluded areas can be recognized and segmented from non-occluded image areas using spectral information indicative for toothpaste, either measured by the on-board camera 106 before brushing and/or provided by a reference database 116 of previously used or tested toothpastes.

The processor 112 may also output a reconstructed map of the anatomical or physiological structure 118 (shown as a single tooth in FIG. 1) and may also output a least occluded image 120. The reconstruction step will be explained in detail below.

Figure 2:
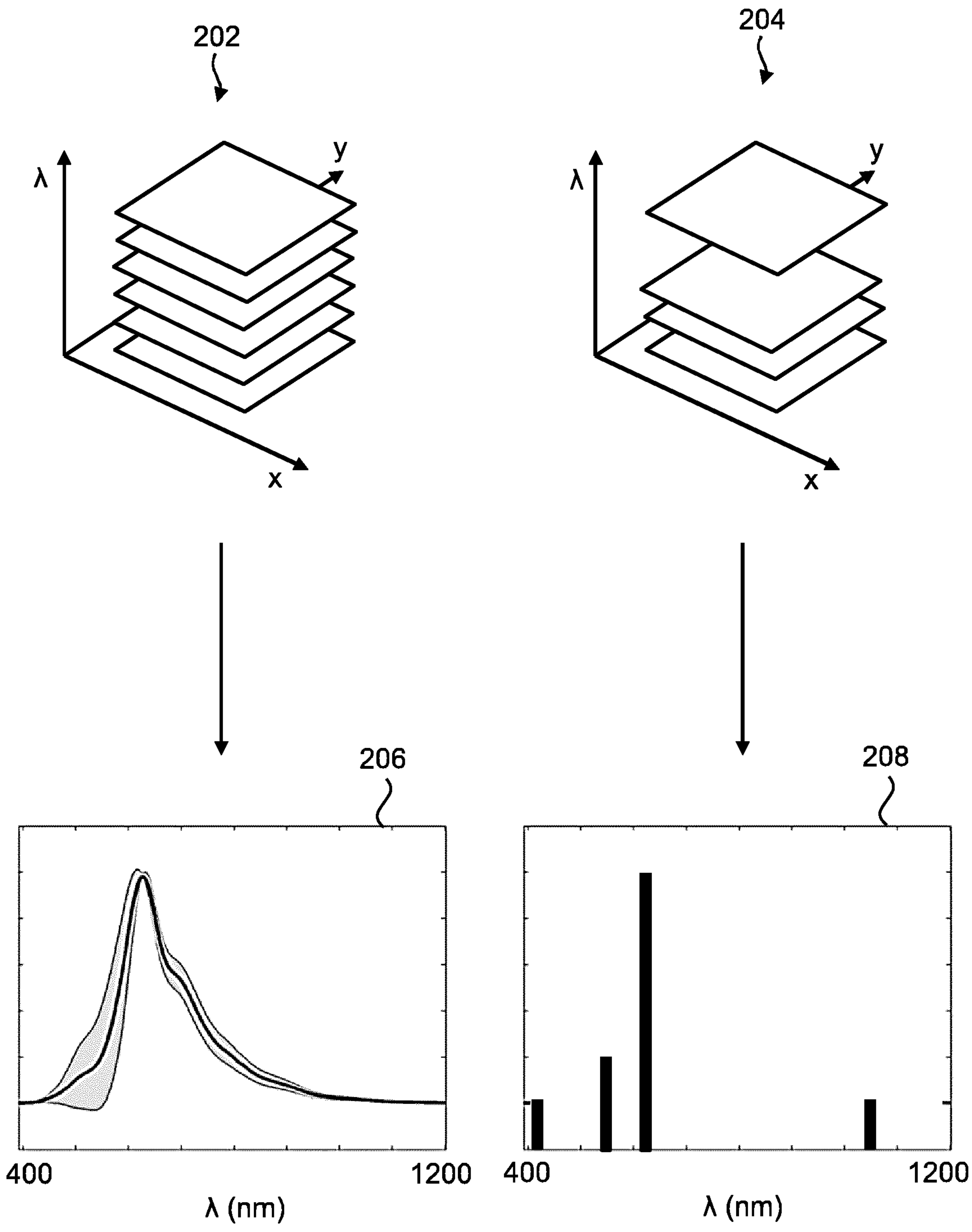
FIG. 2 shows examples of spectral fingerprints.

FIG. 2 shows examples of spectral fingerprints 206 and 208. Two main methods are described to obtain spectral fingerprints. The first method uses a hyperspectral cube 202 whilst the second method uses discrete planes 204 in hyperspectral space. Hyperspectral space defines a space with two spatial dimensions (x, y) whilst the z axis is the wavelength of light.

In theory, hyperspectral cubes are continuous cubes containing data for all wavelengths within the cube. However, in practice, continuous measurements for all wavelengths within the cube are impractical or impossible. Thus, in this context, hyperspectral cubes will generally refer to a plurality of planes (i.e. images) stacked in the z direction of hyperspectral space. These may also be referred to as multispectral cubes.

For the first method, the acquired spectral data of an adjuvant is contained in a hyperspectral cube 202. A plane through the hyperspectral cube 202 at a particular wavelength represents the image as seen under such light illumination. A fingerprinting algorithm can then use the whole hyperspectral cube 202 for the adjuvant to target and segment the adjuvant from images.

Statistically significant frequencies that characterize the adjuvant in question may be extracted. This may be performed by averaging the spectral profiles for all the slices of the hyperspectral cube 202, resulting in a curve such as the curve shown in graph 206.

Such process can be performed with a variety of mathematical methods ranging from the classical linear Principal Component Analysis (PCA), more advanced Independent Component Analysis (ICA) or AI based methods like autoencoders and their variational types. Furthermore, a pass of features selection may be added to extract, in a more reliable way, the most significant features that contribute to the spectral fingerprint.

Graph 206 shows an example of a spectral fingerprint for toothpaste. The mean is shown as the center solid line and the variance is shown as the two lines above and below the center solid line. The fingerprint shows the spectrum of a toothpaste amount deposited on a toothbrush head and acquired by an onboard camera. The center solid line represents the mean PCA results from the acquired hyperspectral cube ranging in wavelength (x axis) from approximately 400 nm to 1200 nm. As this measurement is taken directly from imaging the toothpaste, the measurement represents primarily the reflectance and scattering from the toothpaste surface.

The second method is similar to the first method for obtaining the spectral fingerprint. However, the second method uses a relatively smaller number of discrete planes. For example, this may be achieved by separating an image into three separate red, green and blue channels. The discrete planes shown in image 204 are illustrated to model four discrete spectral components: red (~420 nm), green (~550 nm), blue (~620 nm) and near-infrared (~1050 nm).

Similarly, to the hyperspectral cube 202, each discrete plane in image 204 can be averaged thereby generating a color cluster 208 showing relative (average) wavelength intensity values. The y axis for both graph 206 and color cluster 208 shows wavelengths relative intensity values.

These methods rely on averaging the planes corresponding to different wavelengths in order to obtain the spectral fingerprint. Thus, it will be understood that the images used to generate the hyperspectral cube 202 or the discrete planes in 204 preferably contain only (or mostly) the adjuvant in question to reduce unwanted data.

For example, when determining the spectral fingerprint of a toothpaste using images from a camera integrated into the head of a toothbrush, the bristles may need to be segmented out (or filtered out of the spectral data). Similarly, when using illumination devices such as LEDs (Light Emitting Diodes), glare on the surface of the toothpaste from the illumination may also need to be removed.

The spectral fingerprints 206 or 208 can then be stored in temporary memory (e.g., look-up-table) or permanently (e.g., in a database) for use in segmenting the adjuvant from images.

To enable a database-based definition modality, several examples of toothpaste fingerprints can be used.

Figure 3:
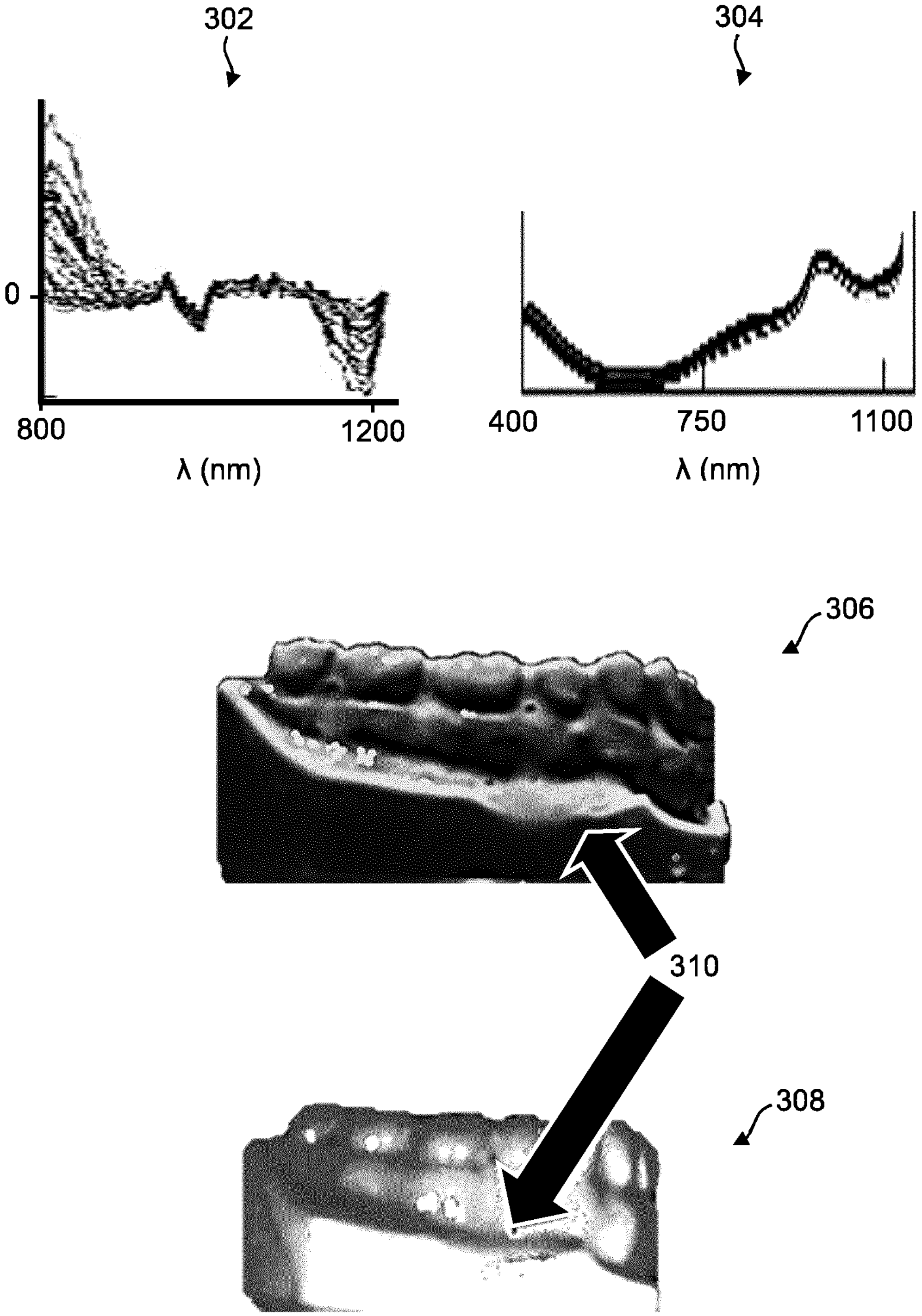
FIG. 3 shows the absorption spectra of a plurality of toothpastes obtained by experimental measurements.

FIG. 3 shows the absorption spectra of a plurality of toothpastes obtained by experimental measurements. In this case, the measurements were taken when the toothpaste was in the form of a diluted slurry according to ISO (International Standards Organization) 11609:2010.

The toothpastes were diluted in a reference diluent in a proportion of 1 to 5 vigorously, mechanically, mixed and stirred until the formation of a homogenous slurry medium (usually about 30 secs). The toothpaste quantity was 1 g as determined by a standard "full head" amount. In the experiments, the toothpastes had an RDA (Relative Dentin Abrasivity) ranging from around 40 to 145.

The toothpastes used were layered on the toothbrush head as in the normal user operation. A pre-calibrated spectroscopic device was used to obtain reference absorption spectra. Graph 302 shows the first derivative of pre-processed absorption spectra from a plurality of toothpastes. The pre-processing involves Savitzky-Golay smoothing the absorption spectra.

Graph 304 shows the raw absorption spectra of several toothpaste slurries over the full spectrum (400-1100 nm). As this measurement is taken from a slurry of toothpastes, the measurement represents primarily absorbance in the bulk of the slurry of toothpaste. For this reason, the peak at around 600 nm in the reflectance shown in graph 206 of FIG. 2 corresponds to the (absorbance) dip at 600 nm in graph 304.

As can be seen, the spectral fingerprints in graph 304 show both optically absorbing properties (which generate the color) and optically scattering properties (which tend to blur the image below the diluted toothpaste). It must be noted that, in particular, the toothpaste shows high absorption (and high scattering) in the NIR spectral band (around 700-1200 nm).

The absorbing properties of toothpastes will typically be more useful for color clustering (or other segmentation techniques) due to the absorption of the toothpastes remaining fairly constant as the structure of the toothpaste changes whilst the scattering properties may change to a larger extent. Of course, whether the absorption or the scattering properties of an adjuvant are used as the spectral fingerprint may depend on the adjuvant itself and whether the scattering and/or the absorption properties change in time.

Both images 306 and 308 show a standard model (typodont) of the lower jaw including teeth covered in a toothpaste slurry obtained applying the standard brushing procedure with toothpaste and water using an electric toothbrush. Image 306 was obtained with natural light illumination whilst image 308 was obtained with IR illumination of approximately 850 nm. Area 310 shown in both images 306 and 308 shows that there is a clear blurring in the IR image 308 which is not present in the natural lighting image 306. The blurring is caused by the presence of the diluted toothpaste in area 310 absorbing and scattering the IR light and, thus, causing blurring in the IR images.

In order to better understand the color clusters (or other spectral components) of the images it may be advantageous to have knowledge of the absorption spectra of different anatomical or physiological structures and components of the image and not just the spectral fingerprint of the adjuvant. Therefore, the acquired spectra were compared with those found in the scientific literature for oral tissues.

According to literature and scientific publications, for example, the human tooth enamel is highly transparent in the NIR band. In fact, the dental enamel scattering is very low at NIR frequencies (meaning the infrared light has a good penetration in the tooth's most external layer). It has been shown that the tooth enamel is almost transparent for NIR light (1053 nm).

Relevant literature which includes the spectra for other oral tissues includes: Hirmer. M. et al. "Spectroscopic Study of Human Teeth and Blood from Visible to Terahertz Frequencies for Clinical Diagnosis of Dental Pulp Vitality." J Infrared Milli Terahz Waves 33, 366-375 (2012). Daniel Fried. R. E. (1995). "Nature of light scattering in dental enamel and dentin at visible and near-infrared wavelengths." Appl. Opt., 34, 1278-1285 and Zandona. A. F. (2019) "Detection and Assessment of Dental Caries". Springer.

This penetration property of NIR on the enamel is also present at around 655 nm and it is a near-continuous function of the light wavelength until about 1300 nm. Additionally, the characteristic spectra of the gingiva may also be used to better segment with the clustering.

As the tooth enamel is nearly transparent in the NIR spectrum whilst the gingiva shows relatively more absorption, the near infrared spectrum (~700-1100 nm) may be particularly advantageous for identifying and segmenting toothpaste in the images. Specifically, the toothpaste has an almost unique signature as low reflectance and high absorbance feature in the IR spectrum. As a consequence of the low reflection and high absorbance (and scattering), a camera image of toothpaste at the IR frequencies is typically very dark (i.e. relatively low pixel values).

This can be seen in the area 310 of the IR image 308 as the gum line appears darker in the right part of the IR image 308 as compared to the toothpaste filled areas visible in the left part of the natural light image 306. A similar effect occurs in the interdental spaces where the diluted toothpaste is also present. Thus, the IR image 308 can be further used to detect the presence of toothpaste by detecting the relative darkening of the image. Thus, images (or parts of images) can be identified where there is no, or very little, toothpaste.

In other cases or personal care applications, particularly advantageous wavelengths may be dependent on the particular region of interest of the user (e.g. mouth, skin, hair etc.) and the adjuvant in question.

Figure 4:
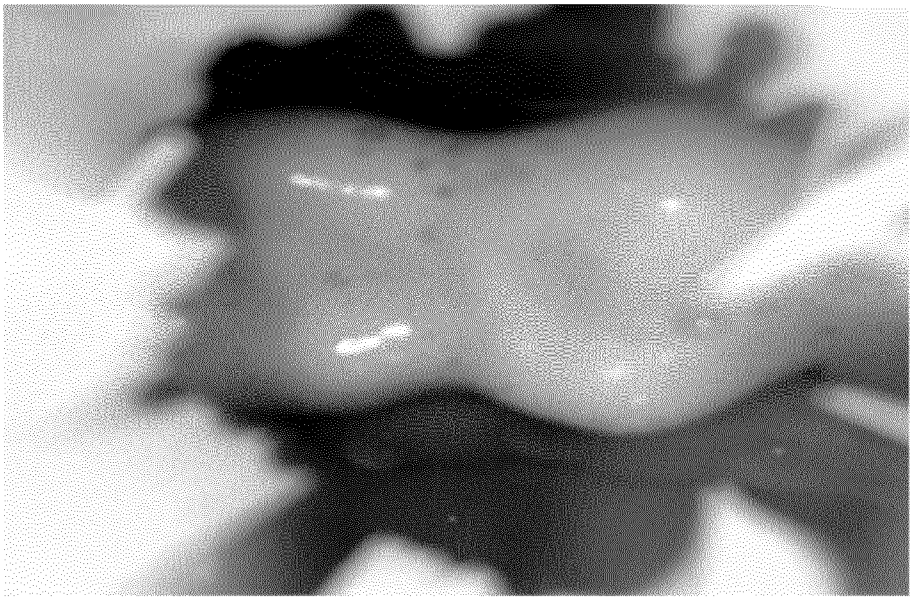
FIG. 4 shows an image of teeth from a camera integrated into a toothbrush.
Figure 4:
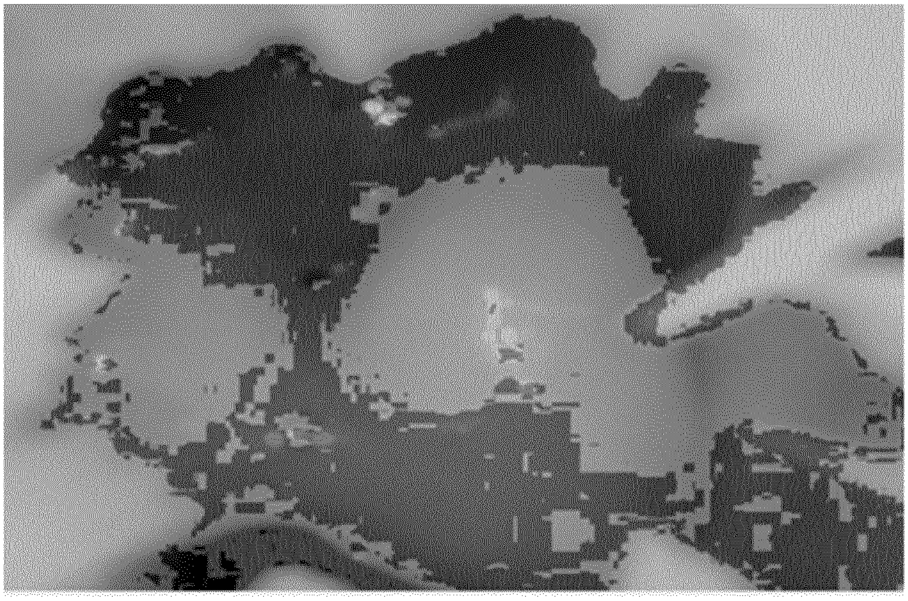

FIG. 4 shows an image 402 of teeth from a camera integrated into a toothbrush. The image 402 contains diluted toothpaste slurry on the teeth and particularly in the interdental space. The toothpaste was segmented from image 402 and removed. The result is shown in image 404 where the areas which included toothpaste in image 402 have been segmented out. In this case, the toothpaste was segmented by comparing per pixel color clusters to the spectral fingerprint of the toothpaste in question.

Various embodiments will now be described for segmenting adjuvant from images. In particular, the embodiments will refer to toothpaste as the adjuvant. However, similar embodiments will also work for other regions of interest and other adjuvants (e.g. shaving cream, skin cream, skin lotion etc.).

In a first embodiment. VIS and NIR images are clustered separately. An algorithm is used to reconstruct, in time/longitudinally, the oral structures from both VIS (~400-700 nm) images and NIR (~700-1100 nm) images separately. The algorithm exploits color clustering and simple geometric feature detection to identify and collect clean patches (i.e. patches with no or minimal toothpaste presence) from the VIS and NIR images. Subsequently, the collected patches are localized (e.g. using onboard location hardware and/or from the geometric features of the images) and used to reconstruct the whole oral structure by means of toothpaste-clean images stitching.

The more detail, the first embodiment involves the following steps:

The first step involves defining/obtaining the spectral fingerprint of the adjuvant before the beginning of the brushing session. The camera on the toothbrush may identify when toothpaste is laid on the bristles of the toothbrush.

The toothpaste laying process may be identified by checking one or more of:

a. The presence of a new object (toothpaste) in the field of view of the camera.
b. A signal from the location hardware indicating the user picking up the toothbrush: or
c. A user-initiated start of the brushing session (e.g., pressing the start button).

The spectral fingerprint may be obtained by one or more of:

i. The acquisition of one or more initial adjuvant images to establish its spectral fingerprint.
ii. Spectral data established in earlier brushing sessions: or
iii. A pre-loaded/defined database or look-up-table.

The second step involves acquiring the approximate positions of the acquired images from an inertial measurement unit (or any other localization devices or methods).

The third step involves identifying patches in the images with no toothpaste by segmenting the toothpaste from the images through per-pixel color clustering and matching the color clusters with the spectral fingerprint of the toothpaste.

The comparison between the spectral components of the images (i.e., the color clusters) and the spectral signature of the toothpaste may be performed using standard computational geometry algorithms such as curve comparison algorithms (e.g. Fréchet distance, the Dynamic Time Warping or a machine learning based algorithm for matching the two spectroscopic fingerprints).

The last step involves reconstructing the oral structures (geometry, anatomy, physiology) using longitudinal stitching. At the end of the acquisition process (e.g., termination of the brushing session or, in some cases, during the brushing session depending on the computational resources available) the complete set of acquired toothpaste-clean patches is used to reconstruct the whole oral anatomical or physiological structure involved (e.g., teeth, gums etc.) using the system data.

The areas, if present, without patch images can be filled with data from, for example, reference images or historic images from previous brushing sessions. Within a reasonably short amount of time (i.e., one or a few brushing sessions), the whole of the teeth and gums may be reconstructed using only the acquired segmented patches.

This whole reconstruction process is performed independently on the VIS and the NIR image sets. Each of the VIS and NIR images typically show different prominent geometric features (depending on how the light interacts with the oral structures) and thus having both gives two sources of the oral structures with slightly varying and complementary features.

In a second embodiment, the VIS images and NIR images may be fused. The fused image typically provides a better image (i.e., with more, and better defined, contrasted details) than the VIS and NIR images separately. These new fused images are then used for the reconstruction process. This procedure is advantageous as the VIS and NIR images have complementary information of the same region of interest (ROI). Complementary information means that details (e.g., types and positions of features in the image) which appear in one type of image (i.e., VIS or NIR) may not appear in the other type and thus the fused image comprises the details from both types.

In order to fuse the two images together, a multi-scale transform approach may be used. Some silicon image sensors are sensitive in the IR band and the VIS spectrum. Thus, one of these sensors, without an IR filter, can be used. Simultaneous VIS and NIR images are acquired. The VIS image comprises a full RGB image capture and the NIR image can comprise a NIR image (~700-1100 nm).

Alternatively, the NIR image could comprise a single, relatively narrow. IR band. For example, a narrow band IR diode or an IR laser (having a single wavelength) could be used to illuminate the ROI.

The two images of the same ROI can be then fused together through a non-subsampled contourlet transform that is built upon non-subsampled pyramids and non-subsampled directional filter banks that split the image into a base layer and details layer. This process enables an increase in the visual quality of the base layer of the fused image and an increase in the detail features and sharpness of the edges in the detailed layer of the fused image.

In a third embodiment, the images are hyperspectral images. The hyperspectral images may be received from a hyperspectral imaging device or reconstructed, in software, from VIS or VISNIR images. The hyperspectral images may give more detail for an improved identification and segmentation of the toothpaste components in the images.

In this case, the spectral components of the image may comprise a plurality of hyperspectral components. For example, the spectral components may be a continuous function of wavelength over relative intensity.

Currently, some hyperspectral imaging sensors may be too physically large for particular ROIs. Thus, reconstructing, in software, a hyperspectral image from the VIS, or VISNIR, images may be advantageous in some cases. If a VIS, or VISNIR, image is used to reconstruct a hyperspectral image, an algorithm (e.g., A.I. or machine learning based) is used to create a hyperspectral approximation of the original VIS or VISNIR image.

A machine learning based algorithm (e.g., sparse coding algorithms) can be trained using a set of generic hyperspectral images (e.g., of generic, real, scenes) or using a set of specific hyperspectral images (e.g., of the oral structures). The images used to train the machine learning based algorithm may preferably be obtained using a hyperspectral imaging sensor.

Alternatively, deep learning algorithms may also be used such as U-net or autoencoders architectures.

Figure 5:
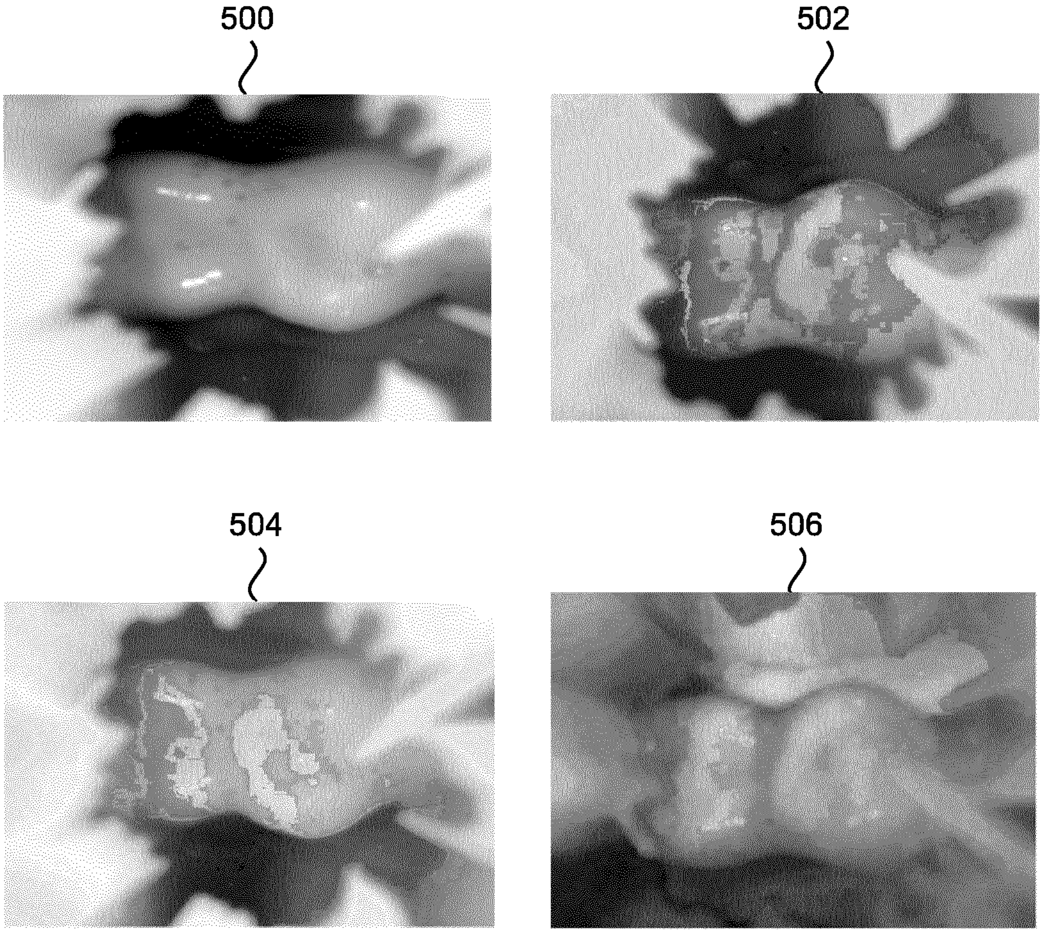
FIG. 5 shows the results of hyperspectral approximation from an RGB image.

FIG. 5 shows the results of hyperspectral approximation from an RGB image 500. The original RGB image 500 is from an RGB camera integrated into the head section of a toothbrush. The original RGB image 500 shows two teeth (top-down view) surrounded by highly diluted and foamed toothpaste during a real brushing session on the typodont. Image 502 is a slice, at 440 nm, of the hyperspectral approximation obtained from the original RGB image 500. Similarly, image 504 is a slice at 550 nm and image 506 is a slice at 620 nm.

The hyperspectral approximation was obtained using a sparse coding algorithm. Many other spectral bands may, and have been, obtained from the hyperspectral approximation.

In the third, hyperspectral, embodiment, the color clustering-based segmentation using the spectral fingerprint can be substituted with a hyperspectral based segmentation, also using the spectral fingerprint. The hyperspectral based segmentation may thus result in cleaner patches from the images (i.e., patches with less and more precisely delineated toothpaste).

In a fourth embodiment, only NIR spectral bands are used. Instead of using a whole multi-spectral set (i.e., VIS and NIR spectra or broader), only the frequencies related to the NIR spectrum are used where the abrasive components (for example hydrated silica) of typical commercial toothpastes have distinctive IR spectral signatures.

In this case, the obtained images may also undergo hyperspectral approximation (in the IR range ~650-1100 nm) in order to obtain an NIR-based hyperspectral image.

The segmentation may then be performed by density clustering NIR spectral bands which, for example, are known to be distinctive in silica spectral fingerprints. Thus, toothpaste presence in the acquired images can be identified from only the NIR spectrum.

The segmentation may involve discarding the images containing an arbitrary given amount of the toothpaste signature. This method will likely result in more brushing sessions being necessary before the full structure can be reconstructed. However, this method will also reduce the processing requirements and may be sufficient for many use cases.

In a fifth embodiment, the spectral fingerprint is continuously updated. In this embodiment, the step of defining the spectral fingerprint is repeated continuously during the cleaning session of the user leading to a periodic update of the target spectral fingerprint of the adjuvant. Thus, as the adjuvant changes over time, the spectral fingerprint can be updated to enable the adjuvant in the acquired images to be identified regardless of the state change.

This allows for the tracking of the changes in the adjuvant spectral fingerprint. In more detail, continuously updating the spectral fingerprint consists of a periodic update of the adjuvant target spectral fingerprint by continuously monitoring the adjuvant.

Figure 6:
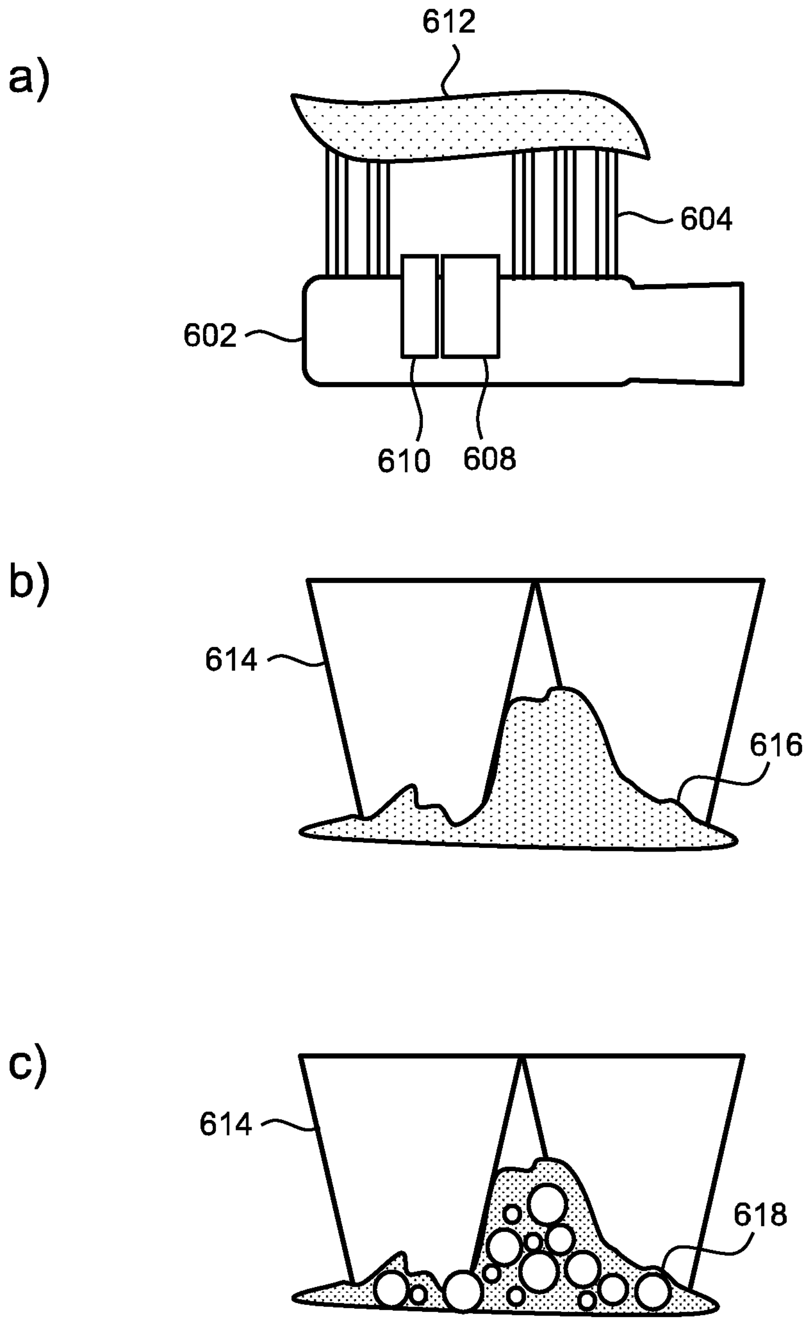
FIG. 6 shows a schematic of toothpaste in three different states.

FIG. 6 shows a schematic of toothpaste in three different states. FIG. 6(*a*) shows the toothpaste in its initial state as a paste 612. The paste 612 is typically placed on top of the bristles 604 of the toothbrush head section 602. In this state, the camera 608 may obtain an initial spectral fingerprint by illuminating the paste 612 with an illumination device 610.

FIG. 6(*b*) shows the toothpaste as a slurry 616 around two teeth 614. The paste 612 shown in FIG. 6(*a*) turns into slurry 616 after it has been mixed with a reference diluent (in experiments on typodont) or in reality with saliva in the mouth of a user, and possibly some water traces from the bristles 604 (if the bristles are pre-wetted before or after toothpaste is applied). FIG. 6(*c*) shows the toothpaste as a foamed slurry 618 around two teeth 614. The foamed slurry 618 occurs when the slurry 616 shown in FIG. 6(*b*) is foamed due to vigorous mechanical forces and, in some cases, bubbles may form from chemicals in the toothpaste or whitening substances (e.g., peroxide).

To store the continuously updated spectral fingerprint, a memory module is used to store and update the stored spectral fingerprint by modifying its data if required to do so.

A linear mixed model may be used to estimate the endmembers of the spectral fingerprint of the adjuvant in the acquired image pixels. In this case, only the pixels containing the adjuvant are monitored to detect changes in the spectral components of such pixels over time.

A threshold mechanism can be used to detect the changes in the spectral components of the adjuvant pixels. If the spectral components exceed a given threshold, the spectral fingerprint can be updated based on the new detected spectral components. In this respect, the spectral fingerprint is not continuously updated but the relevant spectral components are continuously monitored, and the spectral fingerprint is updated as and when required.

Figure 7:
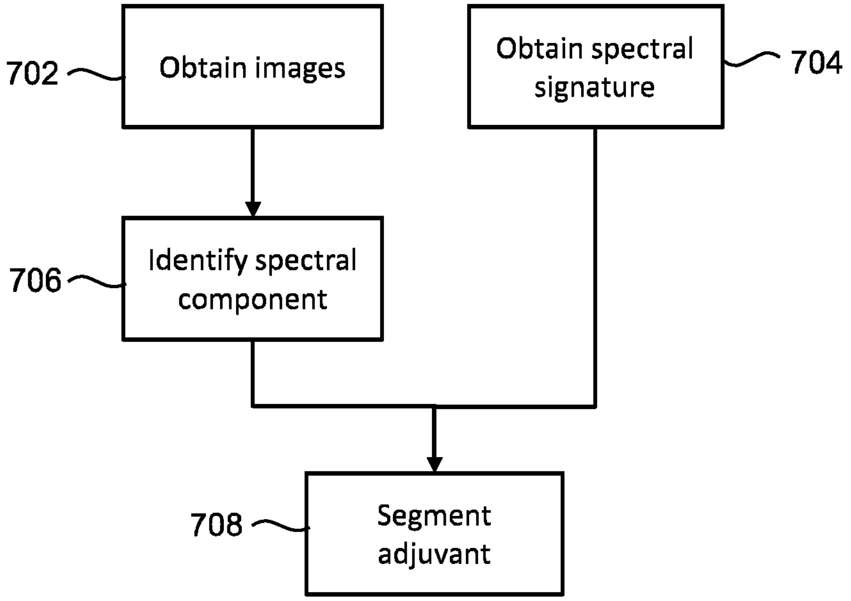
FIG. 7 shows a method for segmenting an adjuvant from images.

FIG. 7 shows a method for segmenting an adjuvant from images. The method comprises obtaining, in step 702, images of the region of interest. The images may be RGB images in the visible spectrum (or other types of images in the visible spectrum), near-infrared images, hyperspectral images, approximated hyperspectral images, multispectral images etc. The camera is configured to capture at least one distinct spectrum band (e.g., conventional cameras capture three bands: red, green and blue). The camera may be configured to capture visible light, infrared (or near-infrared) light. Alternatively, the camera may be a multi or hyper-spectral camera.

The method further comprises obtaining a spectral signature of an adjuvant on the region of interest in step 704. The spectral signature comprises at least one spectral component of the adjuvant. The spectral signature may be a continuous function of spectral components or a set of discrete spectral components. A spectral component indicates the relative intensities between different wavelengths.

The method further comprises identifying spectral components in the images in step 706. The spectral components may be identified by performing per-pixel (or per group of pixels) color clustering on RGB images. Alternatively, a hyperspectral cube (i.e., a hyperspectral image) could be generated from the images via hyperspectral approximation or obtained from a hyperspectral camera.

Hyperspectral imaging draws in information of a broad spectrum of wavelengths such that any object should have a unique spectral signature. Thus, any object could be identified. Of course, if particularly unique spectral bands are known for an adjuvant, images may be obtained for these particular spectral bands instead of hyperspectral imaging (e.g., NIR spectral bands for toothpaste).

Each pixel in the image corresponds to a line in the hyperspectral cube parallel to the wavelength axis at the corresponding pixel location in the position plane (x, y). Thus, a curve can be obtained from this line by plotting the relative intensity at each point on the line with respect to the wavelength. This curve comprises the spectral components of that pixel.

Thus, the adjuvant can be segmented from the images by comparing the spectral signature of the adjuvant to the spectral components of the image's pixels. If the spectral components of a pixel (or group of pixels) in an image is similar enough to the corresponding spectral components in the spectral fingerprint of the adjuvant, then that pixel can be segmented as the adjuvant. For example, for the spectral components to be similar enough, all pixel spectral components must be within a threshold percentage difference (e.g., within 5%) to the adjuvant spectral components.

The segmentation of the adjuvant from the images is particularly advantageous for the reconstruction of the anatomical or physiological structure of a ROI. A method for reconstructing the anatomical or physiological structure will now be described.

Reconstruction of the anatomical or physiological structures involves obtaining a sequence of images of the whole (or most) of the anatomical or physiological structures and also obtaining system data which at least indicates the position of the images relative to a location of the anatomical or physiological structures.

It is common in personal care to regularly repeat a routine action such as periodically brushing the teeth or shaving to maintain an effective treatment. Such repetitions almost never result in exactly the same result or in the person visiting the exact same features in the same order, as human beings are very bad at repeating exactly the same actions or action sequences.

However, the variability in some body structures (e.g., oral cavity, face skin etc.) are limited enough to result in a sort of involuntary almost-repetition during the regular care actions due to their constrained geometry. For example, the brushing actions performed daily on the same teeth typically lead to similar action sequences over time.

Thus, there are two components of such periodic care actions which can be considered: the variability due to human interaction and the quasi-regularity due to the limited scope of the action. Thus, it is proposed to use the knowledge of quasi-regularity in personal care actions to improve the reconstruction process.

Figure 8:
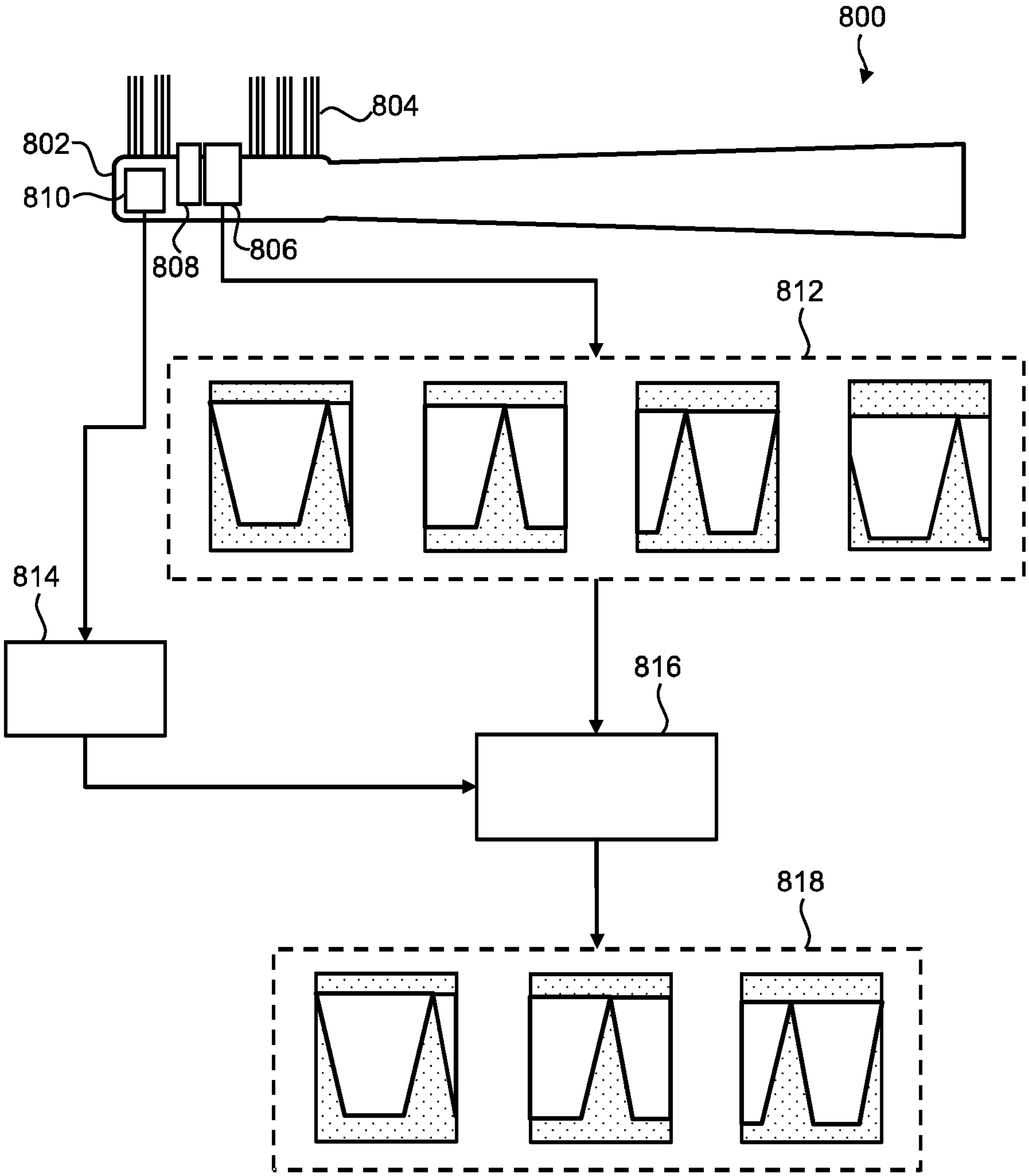
FIG. 8 shows a personal care system for reconstructing anatomical or physiological structures of the oral tissues.

FIG. 8 shows a personal care system for reconstructing anatomical or physiological structures of the oral tissues. The personal care system comprises a toothbrush 800 with a head section 802 and bristles 804 protruding from the head section 802. A camera 806 is used to obtain images of the inside of the mouth of the user and a light emitting device 808 is used to illuminate the mouth. Additionally, in this case, a group of one or more sensors (i.e., a sensor system) is used to obtain system data 814 which at least coveys position information (e.g., including location and orientation data) corresponding to the images obtained from the camera 806.

The camera 806 may be an RGB camera or an imaging device operating in VISNIR bands (~400-1100 nm) as explained above. The camera 806 is used to acquire a sequence of images 812 (e.g., individual images or a video) during regular care (i.e., brushing teeth). Alternatively, the camera 806 may be a miniaturized multispectral camera or an equivalent device capable of outputting hyperspectral images (hyperspectral cubes).

The sensor system may be an inertial measurement unit (IMU). A continuous flow of data may be obtained from the IMU. The IMU may comprise one or more of an accelerometer, a gyroscope, a compass/magnetometer, a force sensor, a motor current sensor, a temperature sensor. Alternatively, the sensor system may be any dynamic monitoring device. The sensor system is for generating the location, orientation or brushing motion and force data 814.

A processor 816 is used to process the sequence of images 812. For example, the sequence of images 812 may be a sequence of occlusion free acquired images which have had the adjuvant segmented out in the manner explained above. The processor 816 analyzes the system data 814 and extracts quasi-periodic behaviors in the user's handling of the toothbrush 800.

In some cases, the processor 816 may further perform a quality screening of the sequence of images 812 to remove incomplete, corrupted, defocused or blurred images from the sequence 812.

Additionally, the processor 816 is configured to reconstruct the oral/anatomical or physiological structures of the user using the sequence of images 812 and the system data 814. For example, the system data 814 may include detailed camera localization data for each image in the sequence 812 using a hyperspectral Rigid Structure from Motion (RSfM) algorithm.

The inclusion of the quasi-periodicity information (i.e., the quasi-periodic behaviors) enables the processor to remove redundancy from the data used in the reconstruction (i.e., from the sequences of images 812 or the system data 814). For example, in FIG. 8, redundancy is removed from the sequence 812 and a new sequence 818 with less redundancy can be used in the reconstruction. Similarly, the system data 814 may also comprise redundancy which can be removed using the quasi-periodic behaviors.

Figure 9:
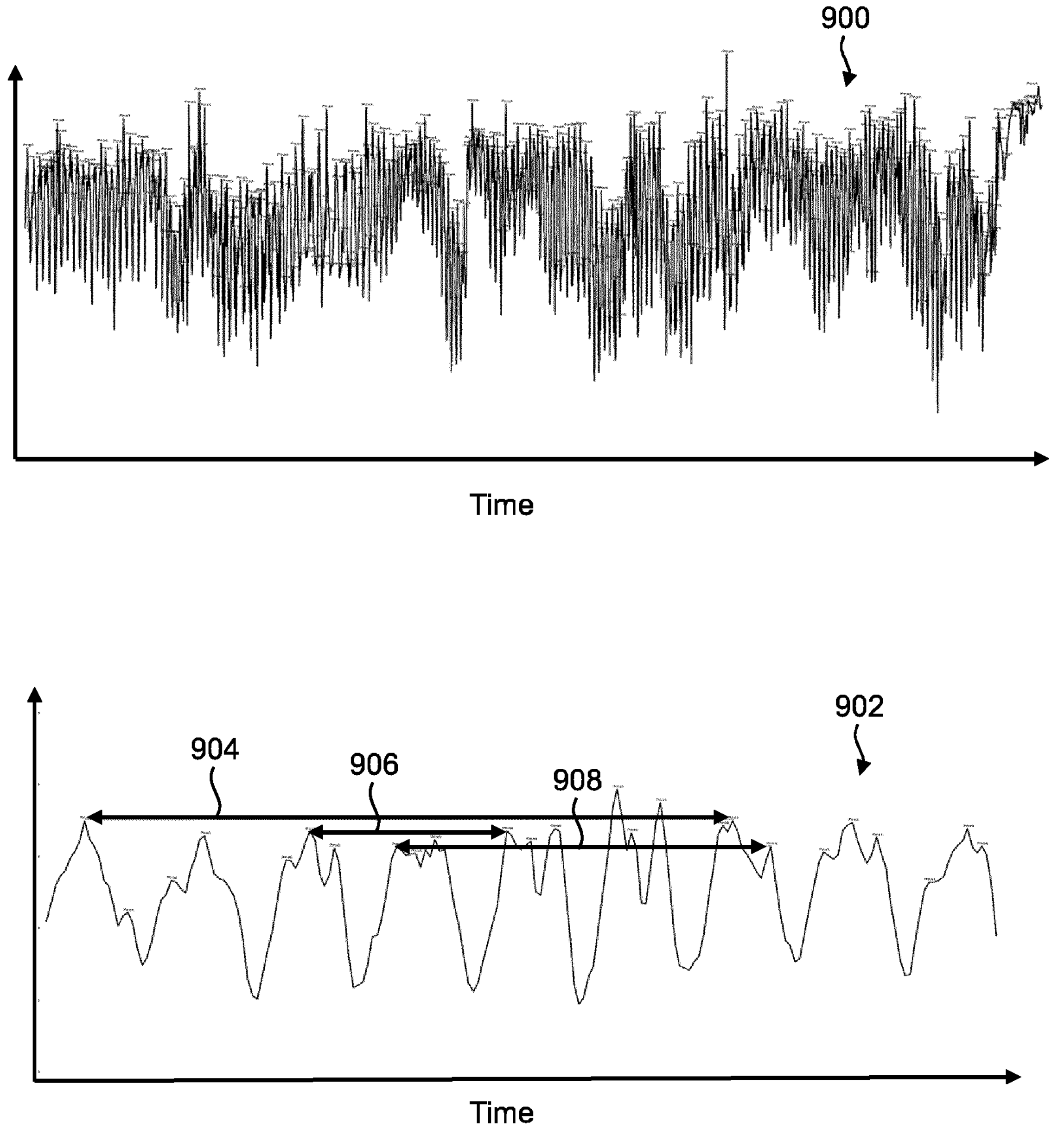
FIG. 9 shows exemplary location data of a toothbrush from an IMU unit during a normal brushing session.
Figure 10:
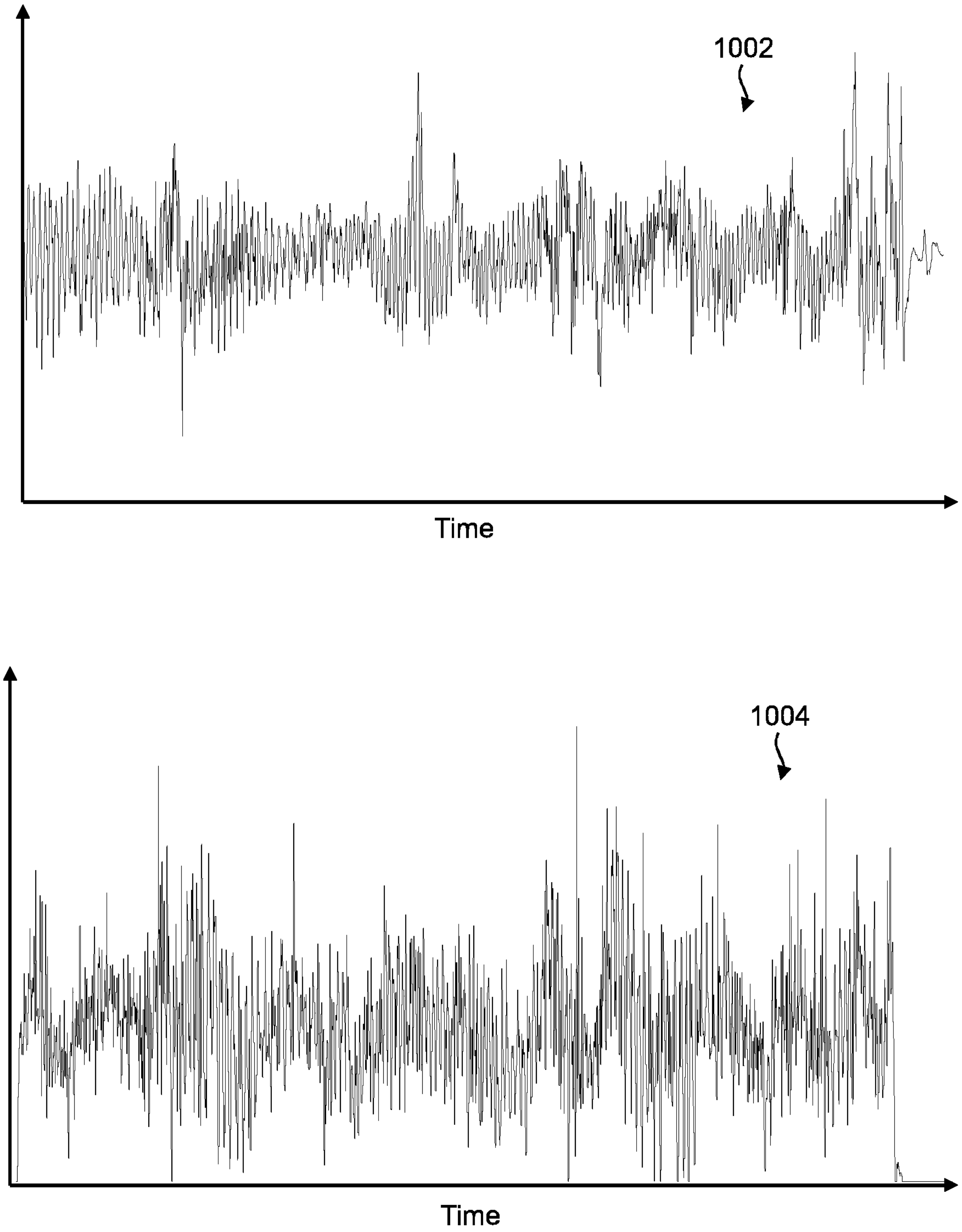
FIG. 10 shows two-dimensional force data of a toothbrush.

FIG. 9 shows exemplary location data of a toothbrush from an IMU unit during a normal brushing session. In particular, location data 900 shows the x component of an accelerometer (y axis) over time (x axis). Location data 902 is an enlarged section of location data 900. Exemplary quasi-periodic behaviors are shown by the arrows 904, 906 and 908. Similarly. FIG. 10 shows two-dimensional force data of a toothbrush. Data 1002 shows the x component of a gyroscope (y axis) in the toothbrush over time (x axis) and data 1004 shows force (y axis) over time (x axis) from a force sensor in the toothbrush. As can be seen from FIGS. 9 and 10, the location and force data can show quasi-periodic behavior and these behaviors can be extracted from the data itself. Of course, the y and z components of the accelerometer and of the gyroscope may also be used in the system data. For example, a nine DOF (degree of freedom) IMU may be used. Even more degrees of freedom could also be available. The location data, the force data and/or the gyroscopic data may form part of the so-called "system data". The system data at least includes data which enables the localization of the images relative to each other and/or to a biological region of interest (e.g., a mouth, skin, head etc.).

The system data can be analyzed to extract similarities from its local history (i.e., data from the same toothbrush).

Periodic behaviors (with period ω) can be written as a periodic function $f(x+\omega)=f(x)$. Thus, a first linear quasi-periodic analysis may utilize the signal peaks of the system data to identify approximate linear re-occurrences of quasi-periods ω of the form $f(x+\omega)=Af(x)+B$ where A and B are real constants.

For example, returning to plot 902 in FIG. 9, the peaks are fairly consistent and thus the real constant can be assumed to be A~1. In this case, the quasi-periodic function can be used in, approximately, the from $|f(x+w)-f(x)|=B$, where the real constant B may act as a sort of threshold. In plot 902, only the peaks are used and compared for ease of computation. The arrows 904, 906 and 908 in FIG. 9 show the correspondence between peaks of similar height. Of course, more complex computations may provide more accurate analysis of the quasi-periodic behaviors.

Optionally, a quasi-periodic behavior (i.e., the quasi-periodic function) may be iteratively updated through a Discrete Fourier Transform (DFT) or a Short Time Fourier Transform (STFT).

This can be done by setting a starting threshold for identifying peaks of the modulus of the DFT(or optionally STFT) of the system data. Initial approximations of the frequencies (i.e., the quasi-periods w) can be found based on the previously identified peaks of the DFT modulus greater than the threshold. The amplitudes of the frequencies can be found by solving DFT(Qf)=DFT(f) where f is the frequency and Qf is the approximate frequency of the quasi-period. In particular, the following steps may be followed:

i. Set a starting threshold for collecting peaks of the modulus of the DFT(or optionally an STFT) of the IMU data;
ii. Find initial approximations of the frequencies (of the quasi-periods. Qf), starting from the peaks of the DFT greater than the threshold;
iii. Find the amplitudes of the frequencies found in the previous step, by solving DFT(Qf)=DFT(f);
iv. Simultaneously refine all the frequencies and amplitudes of the current quasi-periodic approximation of f(x+ω) by solving DFT(Qf)=DFT(f); and
v. Perform a DFT of the input signal minus the current quasi-periodic approximation f(x+ω) obtained in step iv, decrease the threshold and go back to step ii.

Thus, all the frequencies and amplitudes of the current quasi-periodic approximation f(x+ω) can be simultaneously refined by solving DFT(Qf)=DFT(f).

In order to iteratively improve the quasi-periodic function, the difference between the input signal (i.e., the system data) and the current quasi-periodic function is performed and the DFT of the difference is found. Based on the DFT of the difference, the threshold previously used to for identifying peaks is updated for the next iteration.

Figure 11:
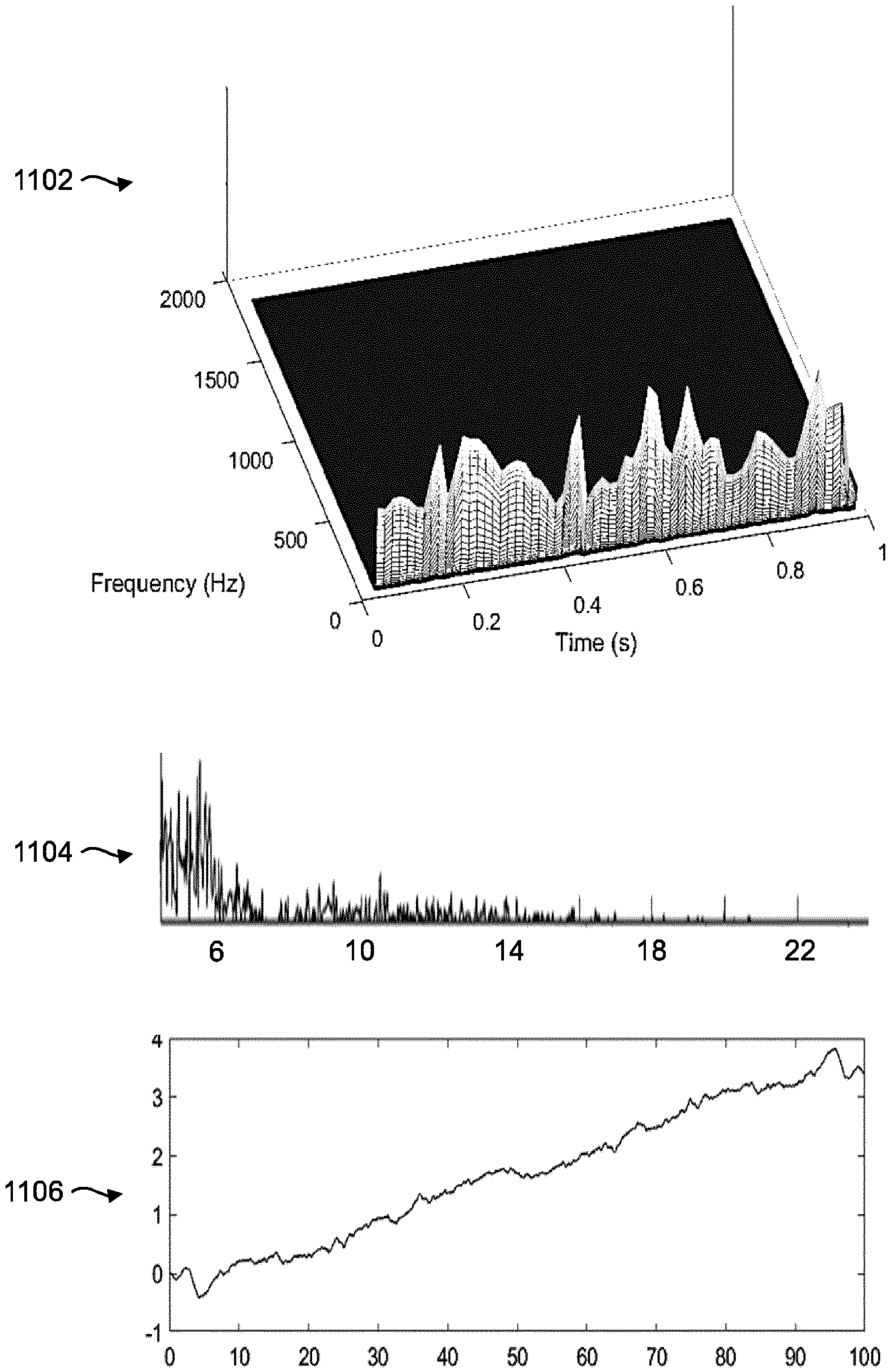
FIG. 11 shows a spectrogram of system data, in particular position data.

FIG. 11 shows a spectrogram of system data. Plot 1102 shows the spectrogram, obtained via DFT, of the system data with time(s) in the x axis, frequency (Hz) in the y axis and relative intensity in the z axis (arbitrary units). Plot 1104 shows the modulus of the spectrogram 1102 with frequency (Hz) in the x axis and relative intensity in the x axis (arbitrary units). Plot 1106 shows the phase of the spectrogram 1102.

The reconstruction of a 3D map of anatomical or physiological structures is typically performed with detailed camera localization data corresponding to a series of images taken from a user's anatomy (e.g., oral, facial skin etc.). These images are taken from approximately the same area multiple times during some time interval (e.g., days, weeks etc.). Thus, there are some redundancies in the data obtained which can be exploited in the geometry reconstruction process.

The reconstruction process can exploit the quasi-periodic behaviors of the user to speed-up the RSfM algorithm by, for example, identifying similar sequences of movements which lead to the acquisition of similar data (i.e., similar images and/or similar system data). In this case, pre-computed values for the RSfM algorithm could be re-used (e.g., approximate 3D mesh components or more detailed volumes of the structures).

Similarly, the quasi-periodic behaviors could be used to identify similar images in the acquired sequence of images. This could enable the RSfM algorithm to skip the processing of all images as some images could be substituted with a previously processed image result if they are similar enough to the previous image.

Additionally, the use of hyperspectral (or multi-spectral) images in the reconstruction may increase the localization precision for the images. As these images have multiple frequency bands available, this may result in a much more detailed 3D map reconstructed from the sequence extracted from the hyperspectral hypercube.

Hyperspectral images may also lead to a reduced number of images which need to be processed as there will be similarities with previous, already processed, hyperspectral images.

Additionally, the hyperspectral images provide more opportunities for the removal of redundancy in the hyperspectral image by using the quasi-periodic behaviors.

Figure 12:
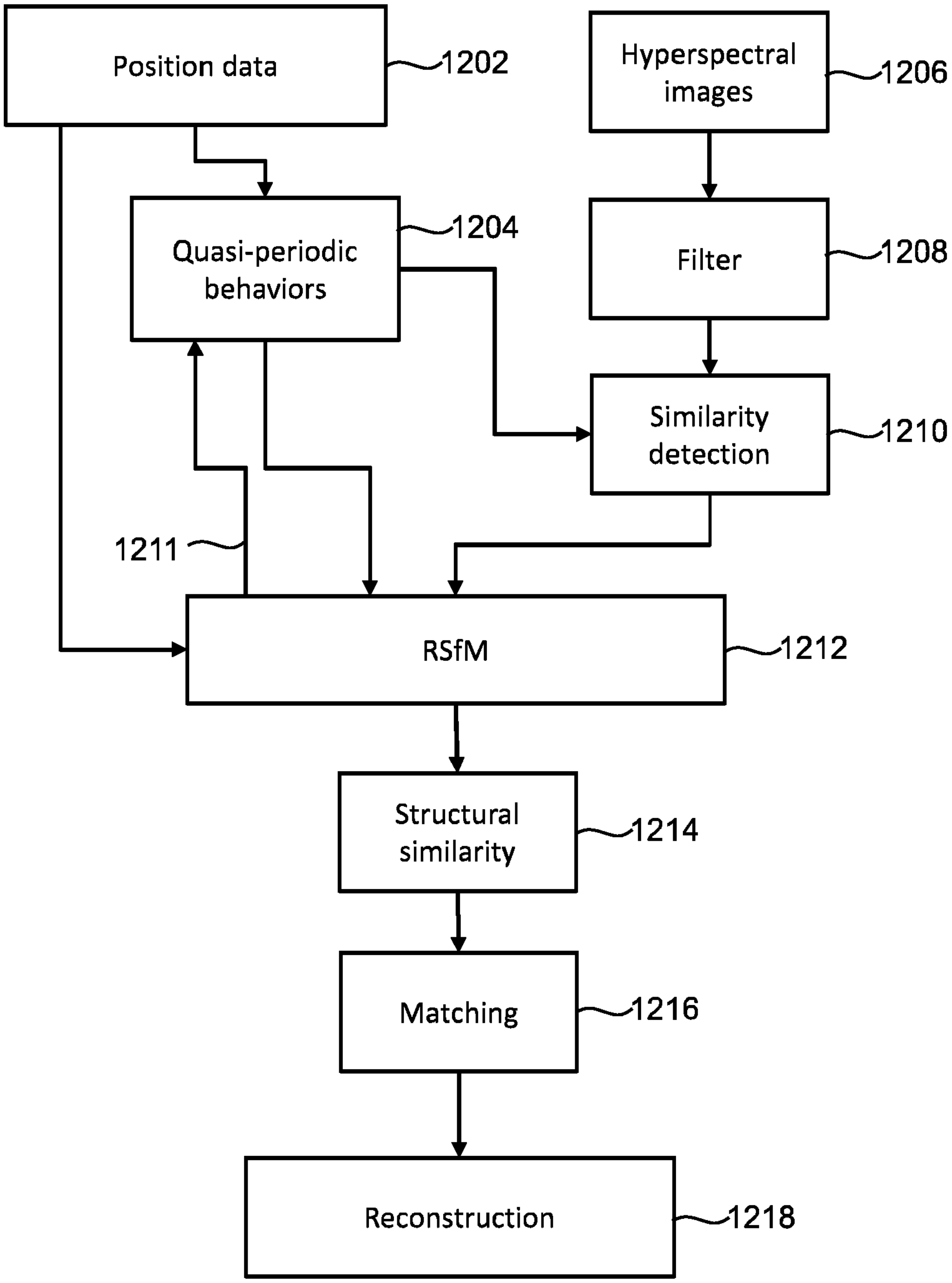
FIG. 12 shows a method for reconstructing the biological or physiological structures of a region of interest.

FIG. 12 shows a method for reconstructing the biological or physiological structures of a region of interest. The method involves obtaining system data (e.g., force, motion and/or orientation data which at least provides relative position information) in step 1202 and extracting quasi-periodic behaviors from the system data in step 1204.

Additionally, hyperspectral images are acquired in step 1206. The hyperspectral images are pre-processed on-the-fly in order to reduce the computational cost of reconstruction. The pre-processing involves filtering out images with lower or inadequate quality parameters in step 1208. For example, images with incomplete frames, images with a completely or mostly occluded field of view, grainy images or out of focus images are filtered out.

If there is a prototypical similar image, then this similar prototype image can be used to compare the current one using a multiscale structural similarity index/measure (MS-SSIM).

If there are not any sufficiently similar images to use as references then a blind image quality algorithm (e.g., Blind/Referenceless Image Spatial Quality Evaluator (BRISQUE). High Order Statistics Aggregation (HOSA). KonCept512 etc.) could be applied to determine the quality of the image from, for example, a set of geometric features extracted from the image.

Additionally, the method further comprises detecting similar hyperspectral images in step 1210. This may be achieved using a no-reference hyperspectral algorithm. For example, a difference hashing algorithm could be applied to all the bands of the hyperspectral image. These results are then stored locally, or remotely, to be compared with a list of previously acquired images to find if there are previous images with extremely high similarity to the current one. The set of images to compare to could be local and/or remote (e.g., cloud based). The comparison between the current hash and the stored ones is performed with an appropriate metric (e.g., Hamming distance. Jaro distance. Monge-Elkan distance etc.) for all the hyperspectral bands and then a total computed similarity (i.e., the sum of all the band similarities) is computed as final score.

Detecting similar hyperspectral images in step 1210 may be achieved using a reference hyperspectral algorithm. A reference hyperspectral algorithm follows similar steps to the no-reference algorithm except that the comparison is between the current image and a comparison set (local or remote as above). The comparison may be performed by using a multiscale structural similarity index/measure (MS-SSIM). The comparison is also performed on all the hyperspectral bands and then summed up to obtain the final score.

If one, or more, multispectral images are detected to be similar to a current image, the information from the image processing of the previous images (e.g., parameters, obtained results etc.) may be made available to the processing pipeline to speed-up or increase the quality of the final result.

The images may also pass through an improved localization process (not shown in FIG. 12) which increases the precision of the localization of the images. An initial anatomical or physiological structure is defined at time t=0). The initial anatomical or physiological structure could be defined by a so-called "bootstrap" process where the first batch of acquired images, in different reference positions (i.e., quadrants of the teeth/gums, areas for the face skin etc.), is considered as the initial reference anatomical or physiological structure including anatomical and biological features.

The initial anatomical or physiological structure could also be defined by a so-called "dictionary" process where a standard medical images dictionary-based set of images is used with input from the user. For example, the user could select features of the anatomical or physiological structure or the number of features (e.g., the number of teeth, number of missing teeth, presence of implants, beard style, skin properties etc.).

Alternatively, the initial anatomical or physiological structure could be defined using a so-called "clean acquisition" process where an independent set of images of the anatomical or physiological structure is acquired before (or after) the personal care session in a controlled environment (e.g., uniform lighting, no occlusions etc.).

A voting scheme, identifying the largest number of matches, is used to identify the images from the initial anatomical or physiological structure which most closely match a current image according to the number of matching scale-invariant feature transform (SIFT) features. Thus, the position of the reference image(s) most closely matching the current image becomes an approximate position of the current image.

As the user behavior is typically unpredictable, the camera motion can be estimated between the current image and the reference image(s). In order to estimate the motion of the camera, the difference in view between the current image and a number (N) of the closest matching reference images (N being a small integer number) can be represented as the combined action of a rotation and a translation. To define such geometrical transformations, an eight points algorithm can be used.

The geometrical features obtained from the eight-point algorithm are integrated with a motion estimation obtained from the quasi-periodic behavior to improve the localization. The quasi-periodic behavior can be considered as an approximation of the user movements and thus it can be used to forecast the device position in the near future.

Typically, the set of possible candidate reference images for matching with a current image contains a fairly large number of outliers due to the high variability of the acquisition process (e.g., mostly user movements during brushing). In order to reduce such uncertainty (i.e., reduce the number of outliers), additional geometrical constraints, obtained from the images, and movement constraints, obtained from the system data, could be used. For example, a random sample consensus (RANSAC) algorithm could be used to reduce the numbers of outliers prior to searching for the closest reference images, thus only the "cleanest" reference images are output.

The RANSAC algorithm can be modified in the search phase to include the quasi-periodic behaviors of the user motion and its derivatives to speed up the process of identification of the outliers.

During the localization of the images, it is assumed that the camera intrinsic parameters are known such that the so-called fundamental matrix F of the camera can be estimated.

The method further comprises inputting the hyperspectral images and the system data into a Rigid Structure from Motion (RSfM) algorithm in step 1212 to perform the reconstruction of the anatomical or physiological structure.

Relating the different hyperspectral bands to the same 3D model may cause problems as details may disappear from one band but not from others. For example, a red feature could be very visible in a red band but be missing in a deep blue or ultraviolet band.

Thus, the RSfM algorithm is applied separately to each spectral band of the hyperspectral images resulting in multiple limited, partial. 3D model reconstructions with potentially missing details. The reconstructions may be point sets.

A structural similarity feature is defined in step 1214 for each point set corresponding to the different spectral bands using a structural component of the MS-SSIM. The high level structural features between the different point sets of the spectral bands are matched in step 1216 and thus, the different point sets can be merged together to obtain a more detailed 3D reconstruction of the anatomical or physiological structure.

Additionally, the RSM algorithm and the quasi-periodic behaviors could form a feedback loop 1211 where the differences between the position of a current image calculated by the RSfM algorithm and the forecasted position from the quasi-periodic behaviors are fed back into the analysis of the quasi-periodic behaviors to optimize the search parameters. Alternatively, a forecasting error could be fed back which includes the MS-SSIM value for the current image and the difference between the positions. The higher the MS-SSIM value (defining the difference between the current image and the reference images), the higher the difference between positions is likely to be.

Figure 13:
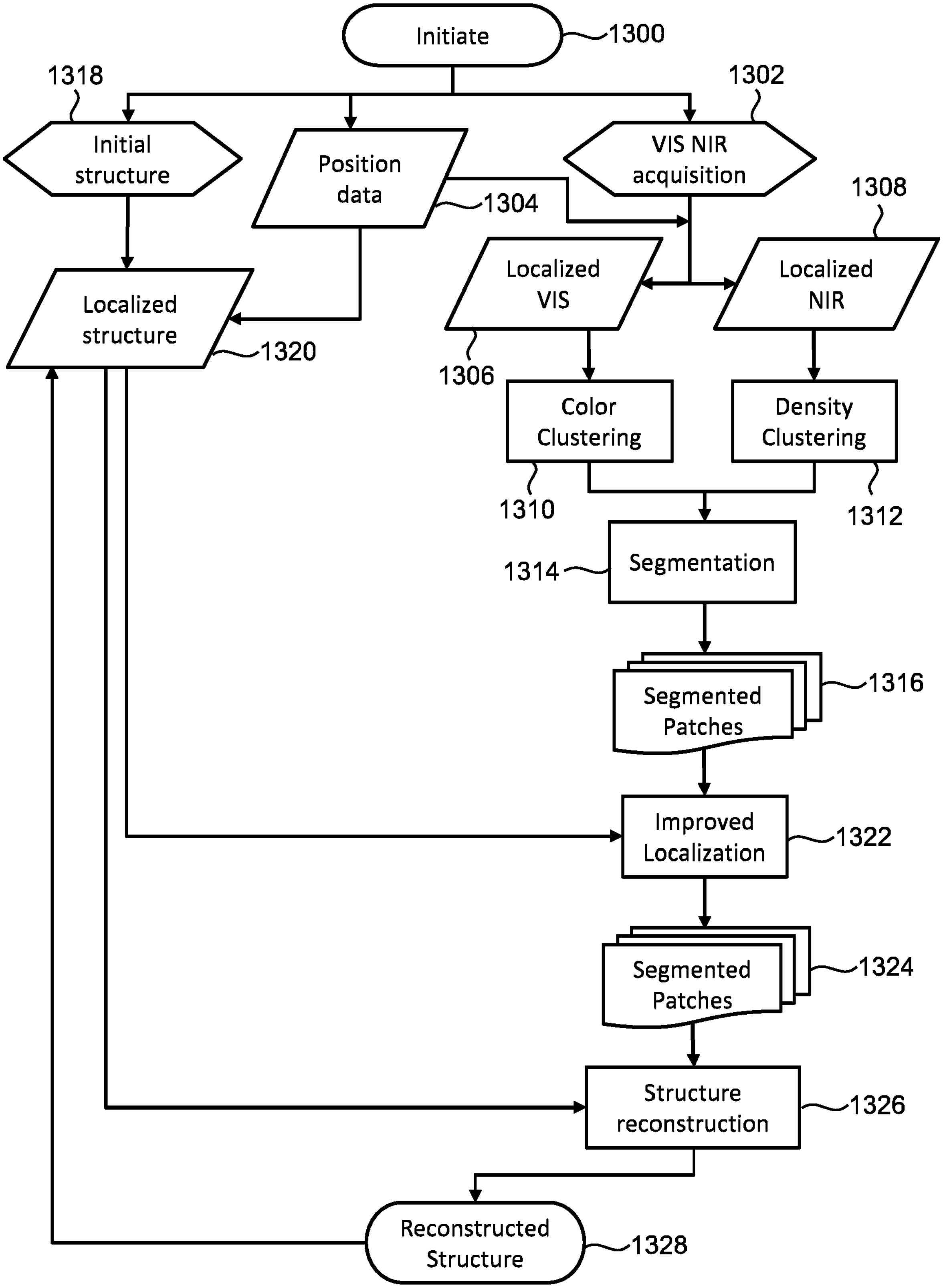
FIG. 13 shows a flow chart for an exemplary method of reconstructing the anatomical or physiological structure of a region of interest.

FIG. 13 shows a flow chart for an exemplary method of reconstructing the anatomical or physiological structure of a region of interest. The method is typically initiated in step 1300 when a user begins a personal care action (e.g., brushing teeth) or event. In this case. VIS and NIR images are acquired in step 1302 and separately localized into localized VIS images 1306 and localized NIR images 1308. The images are localized using system data 1304 obtained, for example, from an IMU on the personal care device (e.g., toothbrush, shaver etc.).

The localized VIS images 1306 are put through a color clustering process 1310 and the localized NIR images 1308 are put through a density clustering process 1312 to obtain spectrum components from the images. The spectrum components and images are passed through a segmentation process 1314 which removes the adjuvant from the images, resulting in localized segmented image patches 1316.

An initial anatomical or physiological structure 1318 comprises a set of reference images of the region of interest (e.g., obtained at time t=0). The reference images can be localized using the system data 1304 to obtain a localized anatomical or physiological structure 1320.

The localized anatomical or physiological structure 1320 can be used in an improved localization process 1322 to increase the precision of the localization of the segmented patches. The improved localization segmented patches 1324 are used in an anatomical or physiological structure reconstruction process 1326 (e.g., RSfM algorithm) to output a better localized reconstructed anatomical or physiological structure 1328 of the region of interest. The reconstructed anatomical or physiological structure 1328 may be fed back into the localized anatomical or physiological structure 1320 to improve its precision and further improve the improved localization process 1322.

The reconstructed anatomical or physiological structure may be a 3D model of anatomical or physiological structure, in particular of the oral anatomy including hard and soft tissues. The region of interest may be a part of the body of a user or object. The sequence of images may comprise two or more images taken at different times. The system data may include one or more motion signals indicative of the movement of the imaging device relative to the region of interest.

In some cases, the reconstructed anatomical or physiological structure may be a 2D reconstruction.

Figure 14:
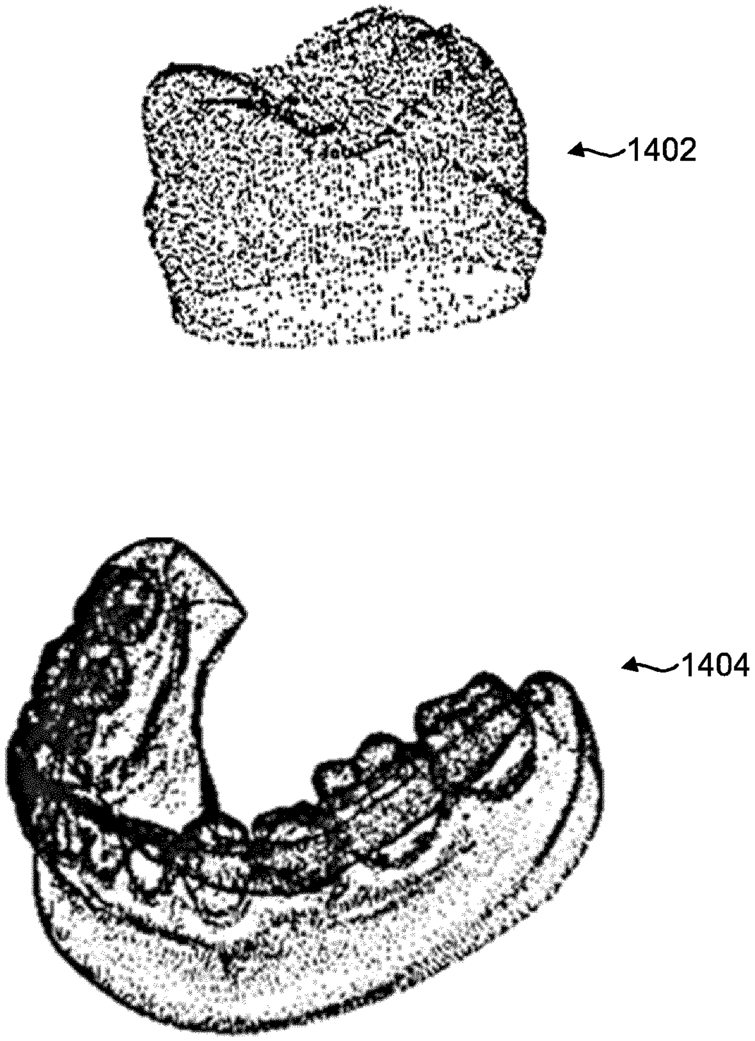
FIG. 14 shows an example of a reconstructed anatomical or physiological structure.

FIG. 14 shows an example of a reconstructed anatomical or physiological structure. Image 1402 shows a point cloud reconstruction of a single tooth and image 1404 shows a point cloud reconstruction of a typodont. In this case, the reconstructed structure shown in image 1404 is a 3D jaw (3D mouth map of a typodont) comprising of a plurality of segmented teeth and the gum tissue which covers an artificial oral jaw bone structure.

The quasi-periodic behaviors may comprise a quasi-periodic function. The quasi-periodic function may be an altered periodic function (e.g., $f(x+w)=Af(x)+B$). As explained above, a periodic function is defined as $f(x+w)=f(x)$ where w is the period of the function.

The quasi-periodic behavior may forecast future movements of the user. The quasi-periodic behaviors may forecast whether an image or system data obtained in the future will be redundant. The reconstruction of the anatomical or physiological structure may be performed using the RSfM algorithm. Other algorithms for reconstructing a 3D model from images and system data could be used.

The system data may, in some cases, be derived from the images themselves. For example, a geometric feature which occurs in different images may be identified and the images containing the geometric feature can be localized relative to each other. Other methods for localizing the images, and thus obtaining system data, may also be used.

The quality parameters used in filtering the sequence of images may comprise an amount of sharpness, an amount of occlusion, an amount of contrast, a comparison between similar images etc.

The images in the sequence of images may be multispectral images or hyperspectral images.

The anatomical or physiological structure may comprise the geometry of said structures.

The previous examples have shown the reconstruction of oral structures and mentioned other biological structures such as the skin when shaving etc. However, it will be appreciated that this method for digitally reconstructing structures of an object can be applied in all manner of fields which require the digital reconstruction of a structure from images.

For example, consider a user imaging a structure with a camera. The movement of the camera will be constrained by the physically possible movements of the user's arm and the possible movement around the object whilst still imaging the structure. If the structure is imaged for the purposes of digital reconstruction, it is likely the user will attempt to image the structure from different angles and positions in order to obtain a large amount of data for the digital reconstruction. The limited movement available to the user in combination with the large amount of data which is being captured is very likely to give rise to quasi-periodic behaviors.

In general, the imaging of an object for digital reconstruction requires a large amount of data and the action of imaging the object will have a limited amount of movements. Thus, the analysis of quasi-periodic behaviors for digital structure reconstructions can be used in many other applications. The invention may for example be of interest in manufacturing and testing generally, for example in the aerospace industry, and it may be applied whenever redundancy may be exploited in multiple images which are being used for reconstructing a structure of an object or a region of an object.

The skilled person would be readily capable of developing a processor for carrying out any herein described method. Thus, each step of a flow chart may represent a different action performed by a processor and may be performed by a respective module of the processor.

As discussed above, the system makes use of processor to perform the data processing. The processor can be implemented in numerous ways, with software and/or hardware, to perform the various functions required. The processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, neural processors. TPU-tensor processing units, dataflow processor, neuromorphic processor, field-programmable gate arrays (FPGAs) and application specific integrated circuits (ASICs).

In various implementations, the processor may be associated with one or more storage media such as volatile and non-volatile computer memory such as RAM, PROM. EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A system for digitally reconstructing a structure of a region of interest for an object, the system comprising part of a personal care device and comprising:
- an imaging device configured to obtain a sequence of images of the region of interest; and
- a processor configured to:
  - analyze system data, including at least data enabling identification of the imaging device position relative to the region of interest, and extract quasi-periodic behaviors from the system data which are caused by personal care actions;
  - remove redundancy in the sequence of images and/or system data using the identified quasi-periodic behaviors; and
  - reconstruct the structure of the region of interest using the sequence of images and system data.

2. The system of claim 1, wherein the processor is configured to remove redundancy by:
- identifying redundant images in the sequence of images based on the quasi-periodic behaviors; and
- removing the redundant images from the sequence of images.

3. The system of claim 1, wherein the processor is further configured to filter the sequence of images to remove images with quality parameters which are inadequate for the reconstruction.

4. The system of claim 1, wherein the images in the sequence of images are multi-spectral images and wherein the structure of the region of interest is reconstructed separately for each spectral band in the multi-spectral images.

5. The system of claim 4, wherein the processor is configured to reconstruct the structure of the region of interest by:
- identifying structural features in the reconstructed structures of the spectral bands; and
- merging the reconstructed structures of the spectral bands by matching the structural features of the spectral bands.

6. The system of claim 1, wherein the processor is further configured to:
- estimate a spatial position of a next image in the sequence of images based on the position of a previous image and the quasi-periodic behaviors;
- obtain a real spatial position of the next image; and
- adapt the quasi-periodic behaviors based on a comparison between the estimated spatial position and the real spatial position.

7. The system of claim 1, further comprising a sensor system, such as an inertial measurement unit, IMU, configured to obtain the system data corresponding to the images in the sequence of images.

8. The system of claim 7, wherein the processor is configured to remove redundancy in the system data based on comparing the system data to the quasi-periodic behaviors.

9. A personal care device comprising:
- a personal care unit and handle; and
- the system of claim 1, wherein the region of interest is the oral cavity or a portion thereof.

10. The personal care device of claim 9, comprising a toothbrush having a toothbrush head section and bristles and wherein the imaging device is configured to obtain images in the direction of the still bristles.

11. A computer-implemented method for digitally reconstructing a structure of a region of interest for an object, the method comprising:
- obtaining a sequence of images of the region of interest using an imaging device which is part of part of a personal care device;
- analyzing system data, including at least data enabling identification of the imaging device position relative to the region of interest, and extract quasi-periodic behaviors from the system data which are caused by personal care actions;
- removing redundancy in the sequence of images and/or system data using the identified quasi-periodic behaviors; and
- reconstructing the structure of the region of interest using the sequence of images and system data.

12. The method of claim 11, wherein removing redundancy comprises:
- identifying redundant images in the sequence of images based on the quasi-periodic behaviors; and
- removing the redundant images from the sequence of images.

13. The method of claim 11, wherein the images in the sequence of images are multi-spectral images and wherein the structure of the region of interest is reconstructed separately for each spectral band in the multi-spectral images.

14. The method of claim 11, further comprising:
- estimating a spatial position of a next image in the sequence of images based on the position of a previous image and the quasi-periodic behaviors;
- obtaining a real spatial position of the next image; and adapting the quasi-periodic behaviors based on a comparison between the estimated spatial position and the real spatial position.

15. A computer program product comprising computer program code which, when executed on a computing device having a processing system, cause the processing system to perform all of the steps of the method according to claim 11.

* * * * *